US010848647B1

(12) United States Patent
Bellomo et al.

(10) Patent No.: US 10,848,647 B1
(45) Date of Patent: Nov. 24, 2020

(54) COMPOSITE ENVIRONMENT FILMMAKING DEVICES, SYSTEMS, PRODUCTS AND METHODS

(71) Applicants: Brendan Bellomo, Las Angeles, CA (US); Michael Hwang, San Jose, CA (US)

(72) Inventors: Brendan Bellomo, Las Angeles, CA (US); Michael Hwang, San Jose, CA (US)

(*) Notice: Subject to any disclaimer, the term of this patent is extended or adjusted under 35 U.S.C. 154(b) by 0 days.

(21) Appl. No.: 16/513,771

(22) Filed: Jul. 17, 2019

(51) Int. Cl.
*H04N 5/222* (2006.01)
*H04N 5/232* (2006.01)
*H04N 5/262* (2006.01)
*H04N 5/225* (2006.01)

(52) U.S. Cl.
CPC ......... *H04N 5/2228* (2013.01); *H04N 5/2256* (2013.01); *H04N 5/23203* (2013.01); *H04N 5/2621* (2013.01)

(58) Field of Classification Search
CPC ............... H04N 5/2228; H04N 5/2256; H04N 5/23203; H04N 5/2621
See application file for complete search history.

(56) References Cited

U.S. PATENT DOCUMENTS

| 9,727,973 | B2 | 8/2017 | Lee | |
|---|---|---|---|---|
| 9,767,612 | B2* | 9/2017 | Bhuruth | G06T 19/006 |
| 2005/0151850 | A1* | 7/2005 | Ahn | G06F 3/017 |
| | | | | 348/207.99 |
| 2010/0134702 | A1* | 6/2010 | Kondo | G03B 21/26 |
| | | | | 348/744 |
| 2015/0036105 | A1* | 2/2015 | Ide | H04N 9/3129 |
| | | | | 353/31 |
| 2018/0075633 | A1* | 3/2018 | Ichieda | G06F 3/048 |
| 2018/0359466 | A1* | 12/2018 | Sugiura | H04N 9/3194 |
| 2019/0253679 | A1* | 8/2019 | Tsubota | G06F 3/04166 |

OTHER PUBLICATIONS

Coherent, Inc., Diode Laser Modules and Pattern Generators, 2011 Catalog, pp. Cover, 1, 47, 51, 59 and Back (2010).
M. Maroti, et al., "The Flooding Time Synchronization Protocol", Proceedings of the 2nd International Conference on Embedded Networked Sensor Systems (SenSys '04) pp. 39-49 (2004).

* cited by examiner

*Primary Examiner* — Luong T Nguyen
(74) *Attorney, Agent, or Firm* — Weitzman Law Offices, LLC

(57) ABSTRACT

Devices, systems and methods, for use in filmmaking involving a composite environment, are disclosed that provide tracking markers for image acquisition and allow, during post processing, for use of the tracking markers to ascertain camera movement during filming and compositing of to-be-inserted images into shots obtained by a cinematic camera without having to remove the tracking markers from the primary images that are composited.

19 Claims, 22 Drawing Sheets

COMPOSITE ENVIRONMENT FILMMAKING DEVICES, SYSTEMS, PRODUCTS AND METHODS

FIELD OF THE INVENTION

This disclosure related to filmmaking and, more particularly, filmmaking involving a film scene requiring post-processing through match moving and/or chroma key compositing.

BACKGROUND

In contemporary filmmaking, many scenes are enhanced with background replacement incorporating either a virtual set created with computer-generated imagery (CGI), or a real background filmed separately from the foreground footage. A commonly used technique is chroma key compositing, also known as "green screening" or "blue screening," where the film set and/or actors are filmed in front of a uniform colored (commonly green or blue) backdrop or screen. In post-production, the uniform color of the backdrop in the footage is made transparent (i.e., "keyed"), so that a computer generated background or different live-action background can be inserted into the footage in its place.

If the camera's viewpoint is changed during the filming of a scene, such as rotating, panning, zooming or otherwise physically moving through space, the to-be-inserted background must be transformed, in either two or three dimensions, in order for the perspective and movement of the new background to match the originally filmed scene. For example, if the camera were to pan to the right at a given rate while filming, stationary objects in the to-be-inserted background would have to move towards the left at precisely the same rate. To accomplish this, the camera's movement must be tracked so that the same movement can be replicated for the to-be-inserted background during post-production. Otherwise, in most cases, realism would be lost.

In order to track the movement of the camera, a process called "match-moving" (also referred to as "camera tracking") is used, wherein multiple tracking markers of a color, pattern, and/or luminance, different from the backdrop or screen, are placed on the backdrop or screen in fixed positions. Those tracking markers will then appear in every frame of the scene so that, in post-production, they can be used to calculate, for each frame of the scene, the camera's relative rotation, position in space, and optical zoom settings. As a result, those markers can be used to calculate the rotations and transformations either to be: i) applied to the to-be-inserted background, ii) used to film new backgrounds with, for example, a robotic "motion control" camera that follows the movement of the original camera to create "match-moved" footage that will contain the to-be-inserted background, or iii) applied to a virtual camera used to render a 3D generated virtual background. Thus, when the main footage for the scene and to-be-inserted background are composited, the two will appear as if they were originally filmed as one.

Use of the composite environment in filmmaking is necessarily more complex than ordinary filmmaking and, as such, involves costly and time-consuming problems not present with filmmaking in a non-composite environment.

First, prior to the filming of one or more scenes, the multiple markers must be individually, manually, placed onto the background screen. Care must be taken to their density, size, shape, color, and (if using self-illuminating markers) luminosity. In addition, the placement locations can be critical to ensure that at least a certain number will be visible at all times during filming. As a result, the placement (and possibly luminosity, if appropriate) of the tracking markers must be done separately for different scenes. This is often a time-consuming process, because most of the time it involves placement of individual adhesive based markers, which uses valuable time on the film set.

Second, the tracking markers must ideally be kept away from places where they will cross behind an object on the set, for example, an actor's head and hair, as their removal from these visually sensitive areas of the video image is both critical and difficult in post-production. This is because, after the markers are used for camera tracking, they must be erased or re-colored to match the chroma key background, during post-processing, due to the fact that the tracking markers are necessarily of a different color than the background screen. Otherwise, if they were not removed or re-colored, they would be present in the composited final scene.

The removal or re-coloring of the tracking markers can be performed procedurally, semi-procedurally (i.e., user assisted), or manually, by a visual effects artist, depending on the marker color and its location relative to foreground objects, which takes time and significant expense, particularly if frames must be processed in a user assisted or manual manner.

More particularly, marker removal is a time-consuming and expensive process because feature films and television scenes can be made up of multiple shots. For example, consider a simple scene of two people sitting in a moving car and talking, filmed in a car on a soundstage lot against a chroma key background (for example, in Los Angeles), and into which the scenery of where the driving is supposed to be taking place (for example, along a street in Washington, DC) will later be inserted. The single scene of that conversation might take up only a few minutes of total screen time in the final film after editing, but could be made up of many shots, i.e., an uninterrupted angle of filming, for example, one shot facing the driver from the passenger's viewpoint, another shot facing the passenger from the driver's viewpoint, another shot filmed from the hood of the car in which the entire passenger compartment is visible, and yet another shot looking out the front of the car from a vantage point just behind the back seats that includes both the driver and passenger, etc. Thus, even a simple scene of a back and forth conversation of that type could involve a distinct shot for each separate utterance by one of the two in the car.

In the case of large scale production, the final film may include many thousands of shots filmed in a chroma key environment.

Conventional digital movie cameras used for cinematography either use CMOS, or in the case of older designed cameras CCD, sensors to capture images, and such cameras typically film at an industry standard 24 frames per second ("fps") because it provides the resolution of standard 35 mm film, although some films have been shot at a higher frame rate of 30 fps, 48 fps, or even 60 fps, and specialized, atypical, cinematic cameras may film at even higher, or non-standard, rates. Other cameras that can be used to capture images, can be set to normal frame rates of one or more of 23.976 fps (for NTSC compatibility), 25 fps (European standard and SECAM), 29.97 fps (color NTSC video standard), 50 fps (Phase Alternating Line (PAL) video and some 1080i cameras), 59.94 fps (NTSC compatible HD video) and 60 fps.

A single shot in a final film edit tends to typically be between about 50 to 500 frames long (i.e., at 24 fps, roughly between 2 seconds and 20 seconds).

Irrespective of the number of shots making up a scene, each frame of each shot filmed in a composite environment must go through its own marker removal process. This involves evaluation of the best methodology for tracking marker removal for the particular shot, which may differ from shot to shot of the same scene, followed by, as decided based upon the evaluation, automated, semi-automated, or fully manual, tracking marker removal from all frames making up each such shot.

Once the markers have been removed, each frame must be individually rendered and checked for artifacts. If the process used for a given shot is inadequate, some to all of its frames must be re-worked before being approved.

The tracking marker removal process involves the efforts (and its attendant cost) of skilled people, such as, for example, "rotoscoping/paint" digital visual effects artists, who remove markers semi-manually or manually with digital compositing software, "compositors" who are artists that remove markers by creating special automatic procedural algorithms customized to each shot, or even each frame in digital video compositing software, "render managers" who render the frames, and "visual effects ('VFX') supervisors" who oversee the process and approval of the final result.

The manual and semi-manual tracking marker removal is done one frame at a time, and will involve multiple people. Manual tracking marker removal by rotoscope/paint artists for a single shot may take hours, or even days, of work. Thus, this post-production work involves significant costs. On large projects, the cost of tracking marker removal alone can range from tens of thousands of dollars to potentially hundreds of thousands of dollars. In an effort to reduce costs, post-production tries to make use of automatic (procedural) marker removal where possible. However, that process often does not work effectively, because it can cause quality issues when markers are too close to actors or set pieces.

Still further, when one or more tracking markers are next to foreground objects, especially those with semi-transparent edges like hair, glass, or out-of-focus objects ("critical image areas"), automatic removal can deteriorate image quality and/or cause artifacts to be present. For those critical image areas, manual tracking marker removal is the only possible approach and great skill is required. Thus, complete automatic tracking marker removal is rarely possible, because scenes inevitably involve circumstances where tracking markers border, or are partially behind, critical image areas.

Third, the presence of the tracking markers are often distracting to the director during filming or when reviewing "dailies," and/or distracting to the director, editor(s), and producer(s) during the editing process, which may occur, in whole or part for a given scene, before compositing to replace the tracking marker-containing chroma key background with the to-be-inserted background replacement.

Thus, there are ongoing technological problems rooted in, and unique to, the use of computer technology as part of film production, and post-production, for shots involving the presence of tracking markers.

SUMMARY

Our technical solutions remedy one or more of the foregoing technological problems. More particularly, our technical solutions eliminate the complications and issues inherent in the conventional approach to adding visual effects to sequences that use tracking markers in a composite environment in a way that is simpler and markedly superior to present approaches.

For purposes of description that follows, the following definitions shall apply. The terms "background" or "backdrop" are intended to mean and encompass any surface where tracking markers will be present during filming of any part of a shot, whether or not a chroma key (green or blue) screen is present. The term "composite environment" is used herein to denote a filming environment where, during filming of a shot, contrasting tracking markers are intermittently present and then match moving will be used during post-production in connection with insertion of other image material into the filmed images or images interpolated therefrom. The terms "contrast" or "contrasting" with respect to tracking markers is intended to mean a detectable difference between the light forming the tracking markers and the backdrop, whether such difference is based upon light intensity, color or some combination of the two.

Our solutions are more efficient than the conventional way of creating final film for footage shot in a composite environment and thereby improve the speed by which those final film sequences are created by saving users from having to remove tracking markers from film images while still allowing for accurate compositing into the footage shot in the composite environment. Still further, although some of our variants use conventional cinematic cameras, they do so in an unconventional way. In addition, the films created using one of the variants described herein are, themselves, a significant improvement because, as filmed, they automatically dispense with tracking markers in the images into which images will later be composited while still providing the information necessary for those images to be accurately composited such that the movement reflected in the added images will be consistent with the camera movement during filming.

One aspect of this disclosure involves a system for use with a cinematic camera that will be filming in a composite environment. The system includes a master control unit (MCU), and a tracking marker projector, (TMP) communicatively connectable to the MCU. The TMP is constructed to periodically project, for a pre-specified duration, multiple tracking markers onto a backdrop within the composite environment, using at least one light source. The MCU is constructed to be communicatively connectable to both the TMP and the cinematic camera and to control the operation of the TMP during filming of frames by the cinematic camera. The system operates such that a) based upon a filming frame rate of the cinematic camera, the MCU will cause the TMP to operate such that, according to a pre-specified projection protocol synchronized with the frame rate timing of the cinematic camera, the TMP will periodically i) during a first time, project the multiple tracking markers onto the backdrop for the pre-specified duration that is less than a frame period, and ii) during a second time, not project the tracking markers. As a result, when the cinematic camera is filming in the composite environment and at least a portion of the backdrop is captured by the cinematic camera, an image stream will be captured that includes a pattern of interleaved images, some of the interleaved images having the backdrop with tracking markers and other images of the interleaved images having the backdrop without tracking markers.

Another aspect involves a master control unit (MCU) device for use in a composite environment. The MCU includes at least one interface through which the MCU will communicate with at least one cinematic camera and at least one tracking marker projector (TMP). The MCU further includes at least one processor, and storage. When the MCU is operating, in response to receipt of a signal from the cinematic camera set to film at a specified frame rate and shutter angle, the at least one processor of the MCU will, based upon the specified frame rate and shutter angle of the cinematic camera, cause a TMP, coupled to the MCU, to project tracking markers onto a backdrop within the composite environment in a repeating manner, for a specified duration, so that sensors of the cinematic camera will, at different times, capture images both with and without tracking markers.

Yet a further aspect involves a tracking marker projector (TMP) device for use in a composite environment. The TMP device includes at least one interface through which the TMP will communicate with a master control unit (MCU), at least one light source that contrasts with a backdrop within the composite environment, and at least one light output, via which tracking markers formed from the at least one light source can selectively be projected onto the backdrop within the composite environment. The TMP includes one or more settings. Wherein the one or more settings includes one or more of: a) brightness of the projected tracking markers, b) a timing offset from timing corresponding to a start of image acquisition in frames of a cinematic camera, c) a duration for display of the projected tracking markers, or d) individual tracking marker output, such that at least one tracking marker can be on while at least one other tracking marker is off.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or aspects of different variants are mutually contradictory, in that they cannot be simultaneously present in a single embodiment. Similarly, some features or advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

This disclosure is further described in the detailed description that follows, with reference to the drawings, in which.

DETAILED DESCRIPTION

Figure 1:
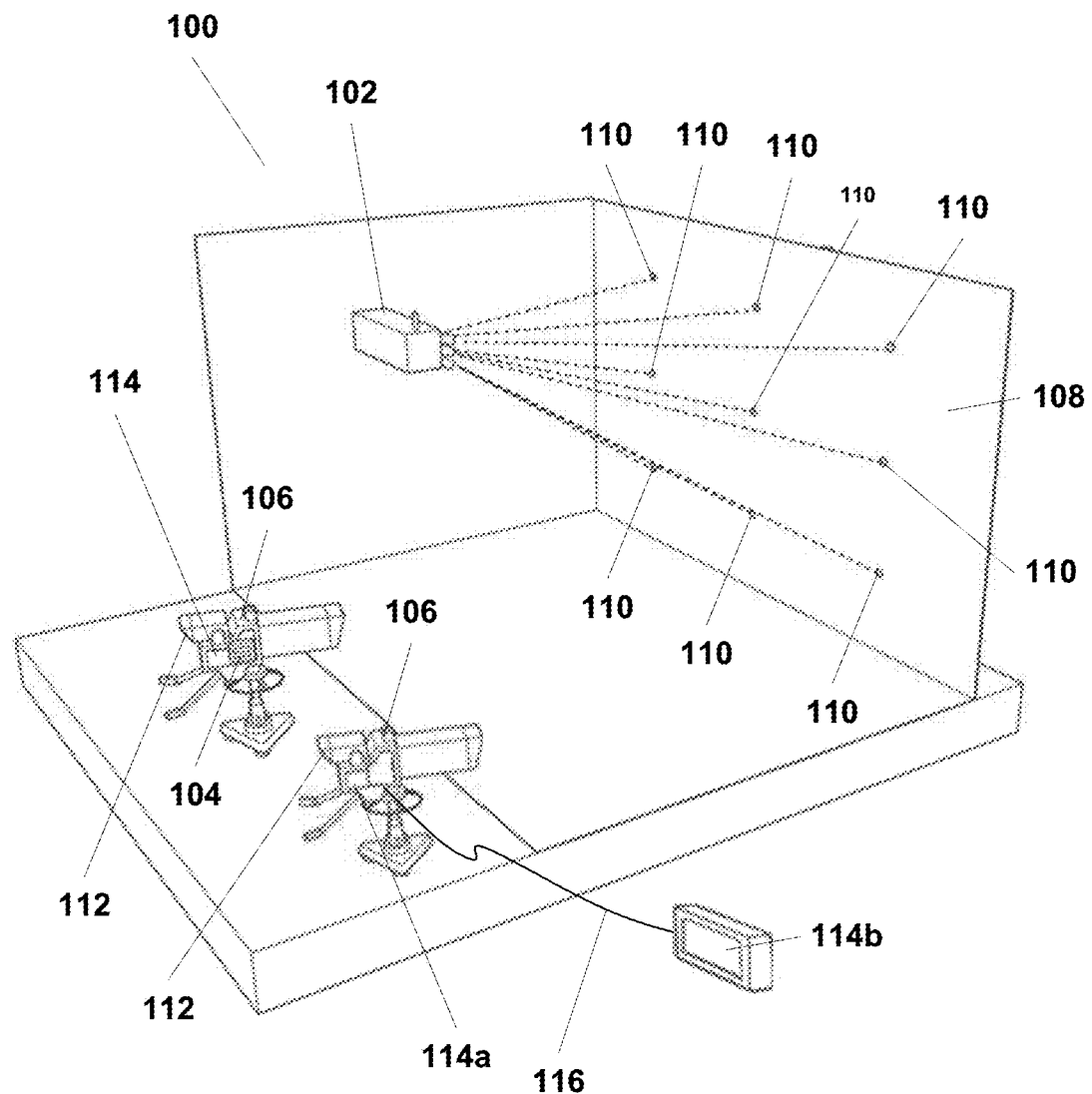
FIG. 1 illustrates, in simplified form, a film set incorporating a representative overview example of one implementation of the teachings described herein.

We have devised a technical solution to the foregoing problems that arise in filmmaking involving a composite environment.

Our technical solution, arising from systems and methods that embody the teachings described herein also makes unconventional use of certain existing technology, namely digital movie cameras used for cinematography.

Our solutions provide different significant solutions to the highly complex and skill-requiring problem caused by the need to use tracking markers during filming in a composite environment, but to then remove the tracking markers from the film prior to compositing into the film other images in place of a backdrop of the composite environment such that the movement of the camera during filming will also be reflected in the inserted images and that the completed film will appear to have been filmed as if, during filming, the set included what is contained within the inserted images. More particularly, aspects of our solutions address problems inherent with setting up of conventional tracking markers for filming, filming using conventional tracking markers, removal of tracking markers during post processing, and compositing of the filmed footage to incorporate other images in place of backdrop within frames.

Our solutions are embodied in different variants of our systems, footage created using variants of our systems, and post processing improvements that result from use of that footage.

As a result of our solutions, multiple benefits are achieved including, but not limited to: (i) improving the functioning of such digital movie cameras by allowing them to capture film shots, in a composite environment, both with and without tracking markers, (ii) elimination of the need for any post-processing tracking marker removal (thereby saving substantial post production time and cost and maintaining image quality), (iii) allowing film personnel to directly view the shot, while it is being filmed, with or without tracking markers, as desired or appropriate, (iv) allowing film personnel to review dailies of shots, immediately after filming, without the distracting presence of tracking markers, and (v) allowing a given shot, or portion thereof, to selectively include only certain tracking markers. Other additional benefits can be achieved from specific embodiments described herein with the understanding that the foregoing advantages and features, as well as those described herein, are a representative few of the advantages and features available from the representative embodiments and are presented only to assist in understanding the invention. It should be understood that they are not to be considered limitations on the invention as defined by the claims, or limitations on equivalents to the claims. For instance, some of the advantages that can be achieved are mutually contradictory, in that they cannot be simultaneously present in a single embodiment. Similarly, some advantages are applicable to one aspect of the invention, and inapplicable to others.

When the teachings of the description and drawings are implemented as a specific embodiment, additional features and advantages may become apparent for that implementation and related implementations.

Our approach makes use of a technique we call "frame splitting", which involves use of the blanking intervals of frames or use of subframes in conjunction with one of multiple different tracking marker projection approaches, as described herein, to provide the foregoing advantages.

Our approach can be used with typical standard frame rates (e.g., 23.976 fps, 24 fps, 25 fps, 29.97 fps, 48 fps, 50 fps, 59.94 fps, and 60 fps) and well as any other nonstandard frame rate, provided that, depending upon the implementation and variant type to be used, the camera is compatible with the teachings herein, e.g., frame rate and shutter angle ensures a blanking interval of suitable duration, or the camera includes the ability to set a frame rate that provides the appropriate subframes. Thus, although the below may be described, for purposes of understanding, in connection with some specific camera types and frame rate(s), it is to be understood that the following is not intended to be limited to current cinematic cameras, any camera, including consumer grade cameras and even, for example, cell phone cameras, that can be operated as described herein and can be operated according to a frame rate that meets the foregoing proviso can be used and is to be considered encompassed by the term "cinematic camera" and the descriptions herein.

FIG. 1 illustrates, in simplified form, a film set 100 incorporating a representative overview example of one implementation of the teachings described herein. In this simplified overview, our approach involves use of one or more tracking marker projector(s) ("TMP") 102 and a master control unit ("MCU") 104 that interacts with the one or more TMPs 102 and one or more digital cinematography camera(s) 106 for filming one or more shots in a composite environment (i.e., incorporating a typical green or blue screen backdrop 108 within the film set 100 into which some other image footage will be composited), as described herein. Note here that although the term "backdrop" is used, it is to be understood that this does not mean that it will be entirely behind what is being filmed. In some cases, the backdrop can be in front of some portion of the film set and/or actors being filmed, for example, backdrop could surround a doorway, lying ahead of a balcony, and through which actors will emerge and turn around towards other actors on the balcony, wherein, through compositing, the backdrop will be replaced by the entry to a dark ages fortress and the balcony replaced by a parapet within the fortress, or the backdrop could be the outside of an alien spaceship with the camera filming through openings in the "backdrop" or from which an actor will emerge. Thus, it is to be remembered that the term "backdrop" is intended to merely mean any surface onto which tracking markers as described herein will be projected, irrespective of where within a particular film set such backdrop may be physically placed.

The TMP 102 projects tracking markers 110 onto the backdrop 108 of the film set 100, at specified time intervals and durations, which are captured by the one or more cinematography cameras 106 according to one of our frame splitting approaches described herein and may be viewed, for example, through a viewfinder 112 of the camera(s) 106 or on a monitor 114a, 114b, for example, a monitor 114a located on the camera 106, or a monitor 114b connected to the camera 106, for example by a wired 116 or wireless connection. The camera(s) 106 provide a signal containing video frame synchronization data to the MCU 104 which processes that signal and sends frame timing and marker brightness information to the TMP 102, for example, over a wired or wireless link, using an analog or digital signal, so that TMP 102 and camera(s) 106 are appropriately synchronized for capture of the video stream as described herein. Such cinema cameras typically incorporate an electronic shutter, which is actually not a camera "shutter" at all in the mechanical sense. Rather, the camera is equipped with an array of sensors that are used for image capture. When the shutter is "open" the image sensors acquire an image for a duration specified by the combination of frame rate and shutter angle. Initiation of image capture occurs at a specified, regular, time interval corresponding to the frame rate (i.e., every $\frac{1}{24}$ of a second for 24 fps, every $\frac{1}{48}$ of a second for 48 fps, etc.). In addition, like conventional motion picture cameras, such cameras 106 can also have a variable shutter angle. The shutter angle affects the duration of time that the image is captured and affects the clarity of anything moving in the shot—the smaller the shutter angles the shorter the image capture time and, consequently, the lower the blur due to movement. For example, for filming at 24 fps, shutter angles of 180 degrees, 90 degrees, 45 degrees and 30 degrees result in respective image capture durations of $\frac{1}{48}$ of a second, $\frac{1}{96}$ of a second, $\frac{1}{192}$ of a second and $\frac{1}{288}$ of a second. The conventional setting for normal filming with cinematography cameras is 180 degree shutter angle. The remaining time within the frame duration is a "blanking" interval. Advantageously, in some variants, we make use of this otherwise unused blanking interval to obtain tracking marker information for use in compositing the image portion of the frame in a process we call "frame splitting." In other variants, we use a variant of our frame splitting approach to not only eliminate the need to remove tracking markers from frames prior to compositing, but also to provide extremely accurate tracking information, well beyond anything that can conventionally be achieved with conventional tracking markers in a composite environment.

More particularly, we take advantage of the existence of, or create an artificial pseudo-blanking interval between, the end of normal image capture within a frame (based upon shutter angle) and the start of the next frame. During that blanking interval, we project tracking markers into the composite environment and force a capture of an image containing the tracking markers. The part of the frame (i.e., containing our tracking marker-containing image) can then later be used for the calculations needed to properly composite the to-be-inserted image into the normally captured image for that frame, and otherwise can or will be discarded or ignored, thereby avoiding any need to remove tracking markers prior to compositing while retaining accuracy and image quality.

Although, in FIG. 1, the one or more TMPs 102 and the MCU 104 are shown as separate units, depending upon the particular implementation, the MCU 104 and a TMP 102 may alternatively be integrated into a single unit, the specific packaging of the various components being largely unimportant to implementing the teachings described herein. Likewise, as shown, the TMP 102 is placed at a location above the set, however, depending upon the particular shot(s), an individual TMP can be located where deemed best, which may be a location above the set, within the set behind some prop on the set, on the ground, or at some distance away from the set, so that appropriate tracking marker placement can be achieved.

With that overview, the individual components, overall system and operation will now be described.

Tracking Marker Projector(s) (TMPs)

Figure 2:
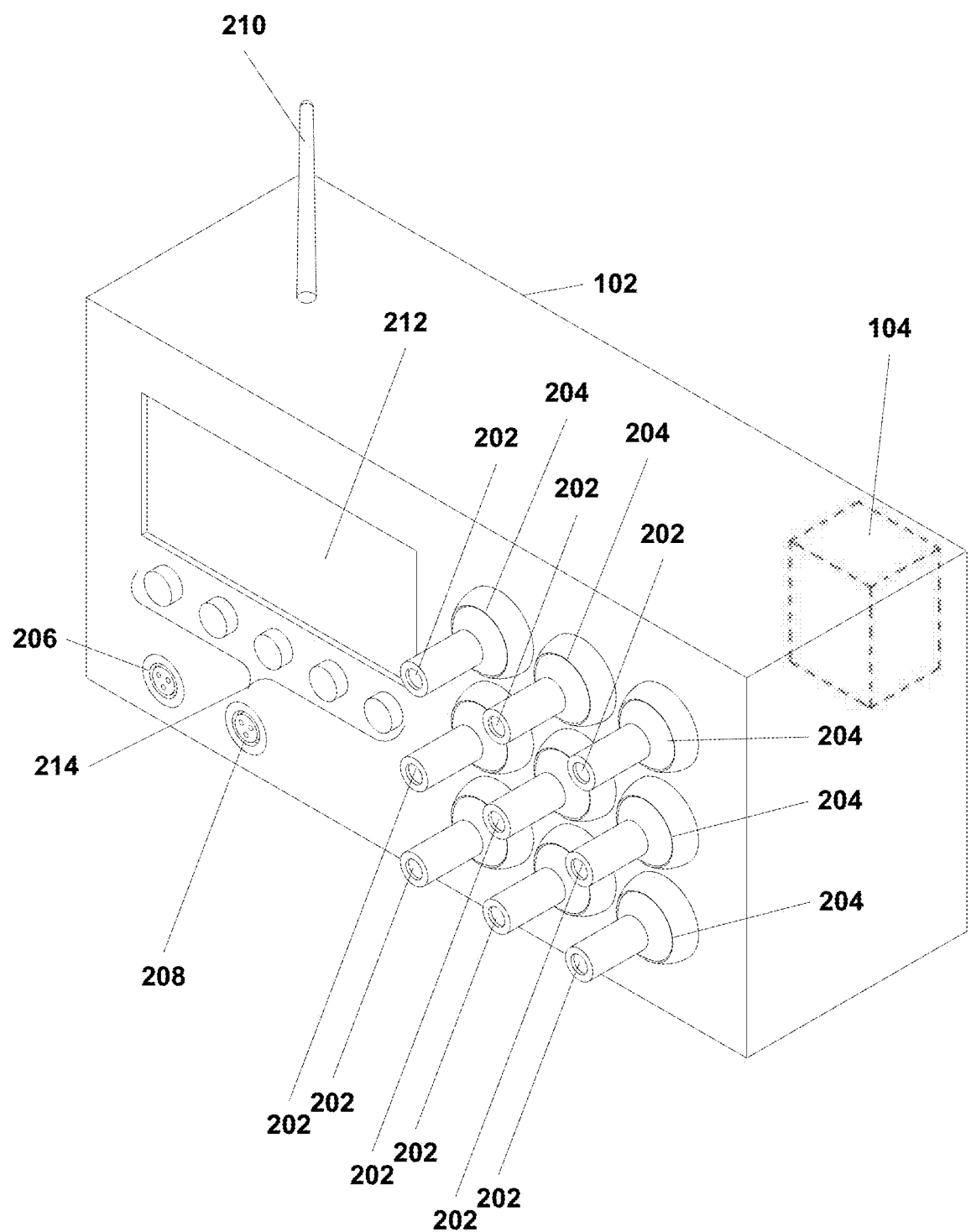
FIG. 2 illustrates, in simplified form, an external perspective view of one example TMP implementation.

FIG. 2 illustrates, in simplified form, an external perspective view of one example TMP 102 implementation. As shown in FIG. 2, the TMP 102 includes one or more light sources (such as, for example, light from focused bulbs, laser projector(s), diode laser(s), LEDs, arc lights, halogen bulbs, plasma illumination sources, metal-halide gas discharge medium arc-length lamps, etc.) that exit the TMP 102 as beams of light through light outputs 202, such as focused lenses, collimators and/or other optics, to project tracking markers onto a backdrop within a composite environment as described in greater detail below. As shown, optionally, the outputs 202 advantageously can further incorporate ball and socket swivel joints 204, so that each output 202 can, if desired, be independently directed towards a location within the composite environment, thereby allowing for ease of tracking marker placement, or placement modification, as compared with placement or modification of conventional tape-type tracking markers. Additionally, or alternatively, any other apparatus that allow for changing placement of the displayed tracking marker can be used, the important aspect being the ability to modify the light beam source direction(s) so as to change the placement of the tracking marker(s), not the apparatus used to do so.

Moreover, in some variants, the TMP 102 could be manufactured such that the controls and certain other components are housed in one housing and, for example, one or more of the light sources and outputs are contained within one or more different housings. It is to be understood that the specific housing(s) that are used to make up a TMP 102 is unimportant—the important point being the components and their operation, not whether they are all housed in a single enclosure or two or more enclosures, the particular enclosure(s) being an implementation detail that is independent of the inventions described herein.

The TMP 102 also includes an input port 206 via which the TMP 102 would receive, via a wired connection, a frame synchronization signal and, optionally, control settings information. The TMP 102 further includes an output port 208 via which the TMP 102 can communicate, and synchronize, with one or more additional TMP 102 units, if present.

Optionally, with some variants, the TMP 102 can further include the MCU 104 within its housing. In such cases, a remote control, an example of which will be described later, may also optionally be provided to allow for changing settings from a distance once the TMP 102 is in place.

Depending upon the particular implementation, optionally one or both of the wired input port 206 and/or output port 208 can be augmented, or replaced, by wireless communication (transmitter and receiver, or transceiver) components, represented purely for purposes of understanding in FIG. 2 by an antenna 210.

The TMP further includes a display 212 and controls 214. The display 212 is used to display information regarding the TMP, for example, light source settings, timing, etc., and the controls 214 are used to adjust settings of the TMP 102, for example, enabling/disabling or changing settings for the light source(s), selecting or changing shape, brightness and/or color, of the tracking markers, adjusting focus, etc.

Multiple markers may be formed from a single light source by shining the light through optical elements ("optics") such as reflective or diffractive beam splitters, by directing the light towards a liquid crystal display or mask/stencil with multiple apertures through which light can pass, or by using one or more mirrors (e.g., a mirror array) and/or prisms, to separate and steer the beams. Moreover, using tiny moving mirrors for individual markers, by themselves or in conjunction with controls coupled to the swivel joints 204, a single beam of light can be moved so fast that the filming of the individual beam at the background will appear in the image as the pattern traced by the beam. In this manner, shapes such as crosses, "L" shapes, triangles or other shapes of tracking markers can be formed for imaging as described herein.

At this point it should be noted that, as used herein, the term "storage" is intended to mean any storage medium that stores data, data-containing structures, and/or program instructions in a non-transitory manner, for example, such as non-transient solid state memory, a magnetic hard drive, a CD or DVD, a tape drive, or an analogous or equivalent storage medium type would.

Figure 3:
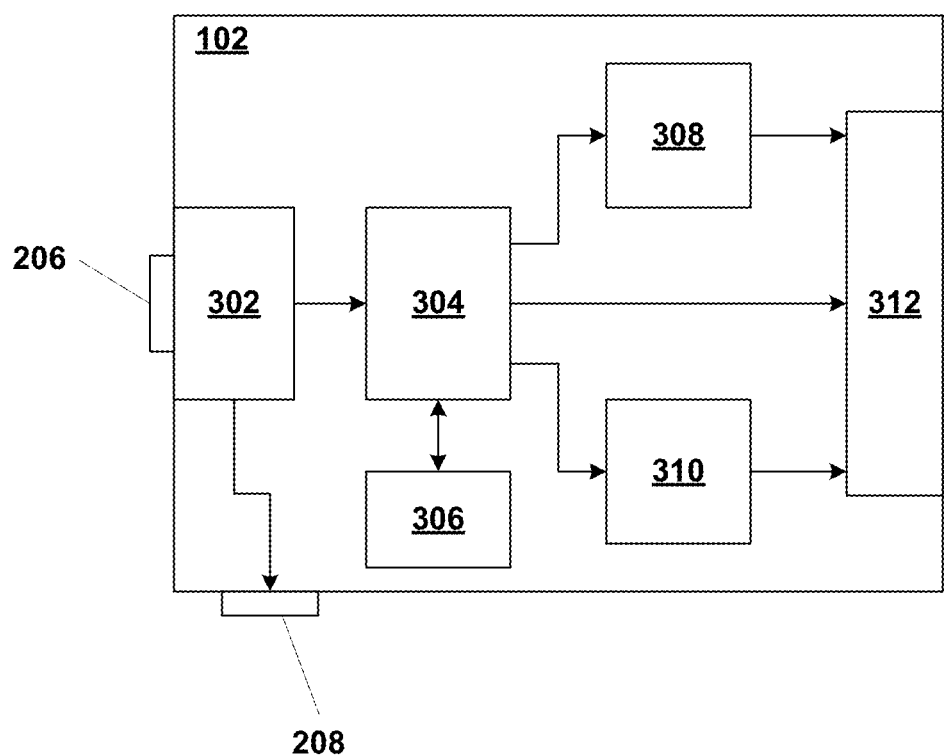
FIG. 3 illustrates, in simplified form, a functional block diagram of a representative TMP, such as the TMP of FIG. 2.

FIG. 3 illustrates, in simplified form, a functional block diagram 300 of a representative TMP, such as the TMP 102 of FIG. 2. Functionally, the TMP is made up of a data interface 302, one or more processors and/or microcontrollers 304, storage 306, which may include RAM and/or ROM for, for example, storage of programming, operational control and setting information, and/or other data to be used for or during TMP operation. The one or more processors and/or microcontrollers 304 are coupled to a light source power controller 308 and light source timing controller 310. Based upon information received from an MCU, under control of the one or more processors 304 (which may be, for example, a microprocessor and/or microcontroller) the light source power controller 308 controls the light source brightness, and the light source timing controller 310 controls the timing of when the light source(s) emit or do not emit. Finally, the TMP 102 includes the light source(s) and optics 312 needed for projection of the tracking markers and their shape(s), which may involve direct control of the optics 312 by the one or more processors 304, under control of a program stored in the storage 306, to, for example, move micro-mirrors, adjust lenses and or collimator(s) to modify or focus the displayed tracking markers, or cause an individual beam to be split into multiple components to achieve an array of markers. Depending upon the particular implementation, received information in the storage 306 can have been written therein by the one or more processors 304 or stored therein using circuitry that implements, for example, known direct memory access ("DMA") or other data-transfer to storage techniques.

As noted above, depending upon the particular implementation, the actual initial source of the light used to create the tracking markers can be a single bulb, multiple individual bulbs, a single laser, or multiple lasers, for example, in the case of lasers light source(s), laser diodes. The outputs of these sources of the light can be anywhere within the human-visible spectrum of about 380 nanometers ("nm") to about 740 nm (since some humans can detect light slightly below 400 nm in the ultraviolet range and slightly into the near infrared range). Advantageously, because of the fact that, in most cases, the tracking markers will not appear in the subframes that will be used for compositing, and the constraint on the use of specific colors against the background is less important or eliminated. Thus, in the case of TMP implementations using laser diodes, a TMP can have multiple different color laser diodes, so that the color(s) can be selected on an individual shot basis, or different TMPs can be constructed each with laser diodes of a single color. Some examples of suitable, commercially available, laser diodes that individually emit in colors within the generally visible light spectrum of 380/400 nm through 700/740 nm inclusive are laser diodes with center wavelengths at 400 nm to 450 nm for the general violet range, 450 nm to 488 nm for the general blue range, 490 nm to 560 nm for the general green range, more specifically, 505 nm for mint green and 532 nm for bright emerald green, 560 nm to 590 nm for the general yellow range, and 590 nm to 700 nm for the general red range. However, it is to be noted that any lasers that emit at a wavelength within the visible light spectrum can be used, and that these specific values and ranges are merely exemplary and reference center wavelength values which should be deemed to also encompass wavelength variations resulting from conventional drift, or variations that may exist based upon: drive, current, voltage, and or temperature (that latter typically specified in terms of nm/° T).

In operation, the TMP 102 will be coupled to the MCU 104 and will receive a signal from the MCU that provides at least tracking marker timing and brightness information and time-synchronization information. The one or more processors 304 will then use the received information to control the operation of the light source power controller 308 and light source timing controller 310 to thereby toggle the light source between emitting and non-emitting states at the correct times, control the light source brightness, and, if present in the implementation and appropriate, adjust the optics 312.

Master Control Unit (MCU)

Figure 4:
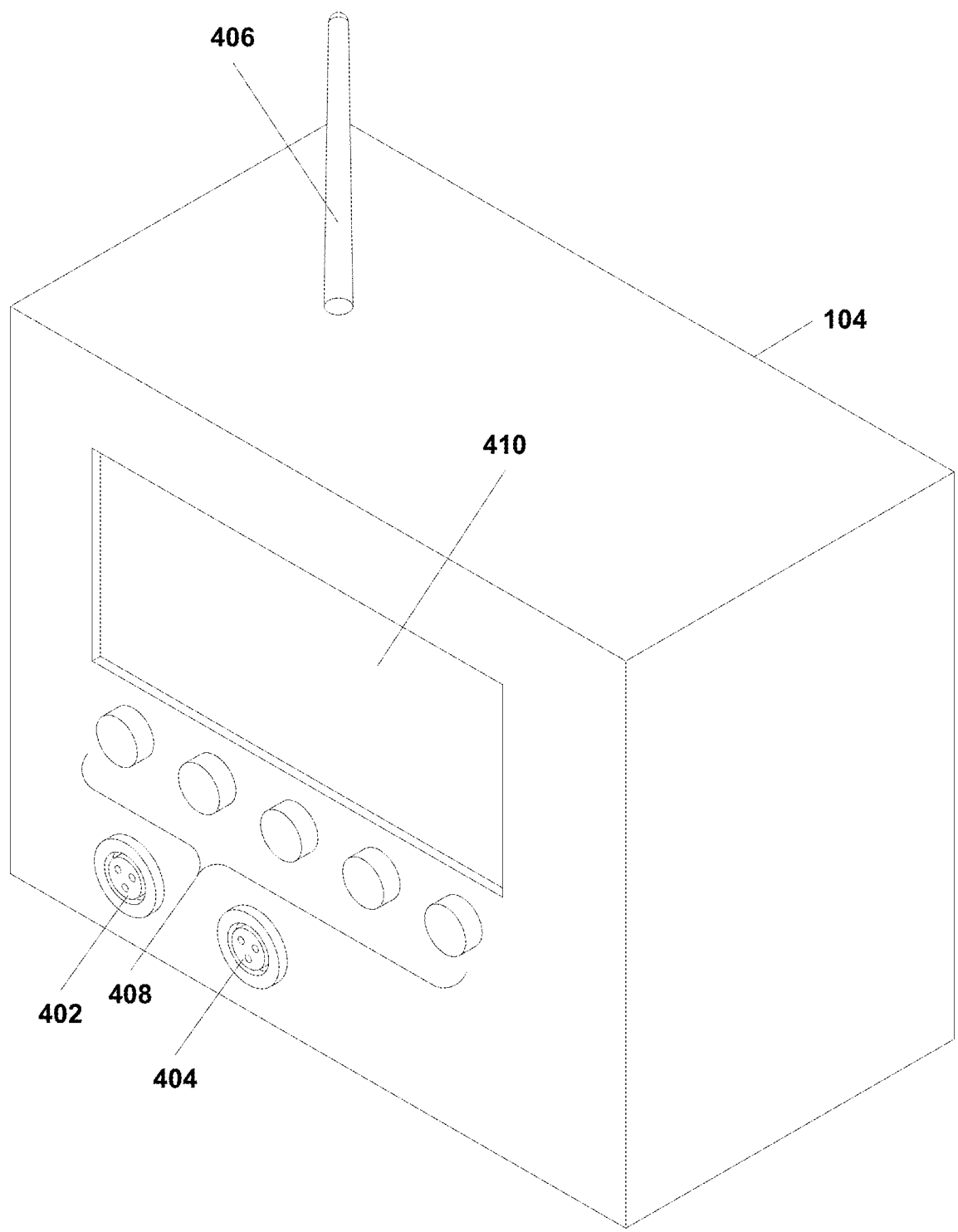
FIG. 4 illustrates, in simplified form, an external perspective view of one example MCU implementation.

FIG. 4 illustrates, in simplified form, an external perspective view of one example MCU 104 implementation. The MCU 104 of FIG. 4 includes a camera input/output ("I/O") port 402 via which the MCU 104 can be coupled via wiring to a port of a cinematic camera in order to receive information it will use to synchronize the TMP 102 with the filming by the camera (e.g., frame rate, shutter angle, etc.) and to trigger image capture during the blanking period of a frame as described herein. Likewise, the MCU 104 includes an output port 404 that is used to couple the MCU 104 to the input port 206 of TMP 102 in order to provide the tracking marker timing and brightness information, and time-synchronization information, to the TMP 102.

As with the TMP 102, depending upon the particular implementation, optionally one or both of the wired input port 402 and/or output port 404 can be augmented, or replaced, by wireless communication (transmitter, receiver, or transceiver), represented purely for purposes of understanding in FIG. 2 by an antenna 406.

Finally, the MCU 104 may have controls 408 and a display 410 that can be used to, for example, adjust the operation of the MCU 104 and/or set or change the TMP 102 settings.

Figure 5:
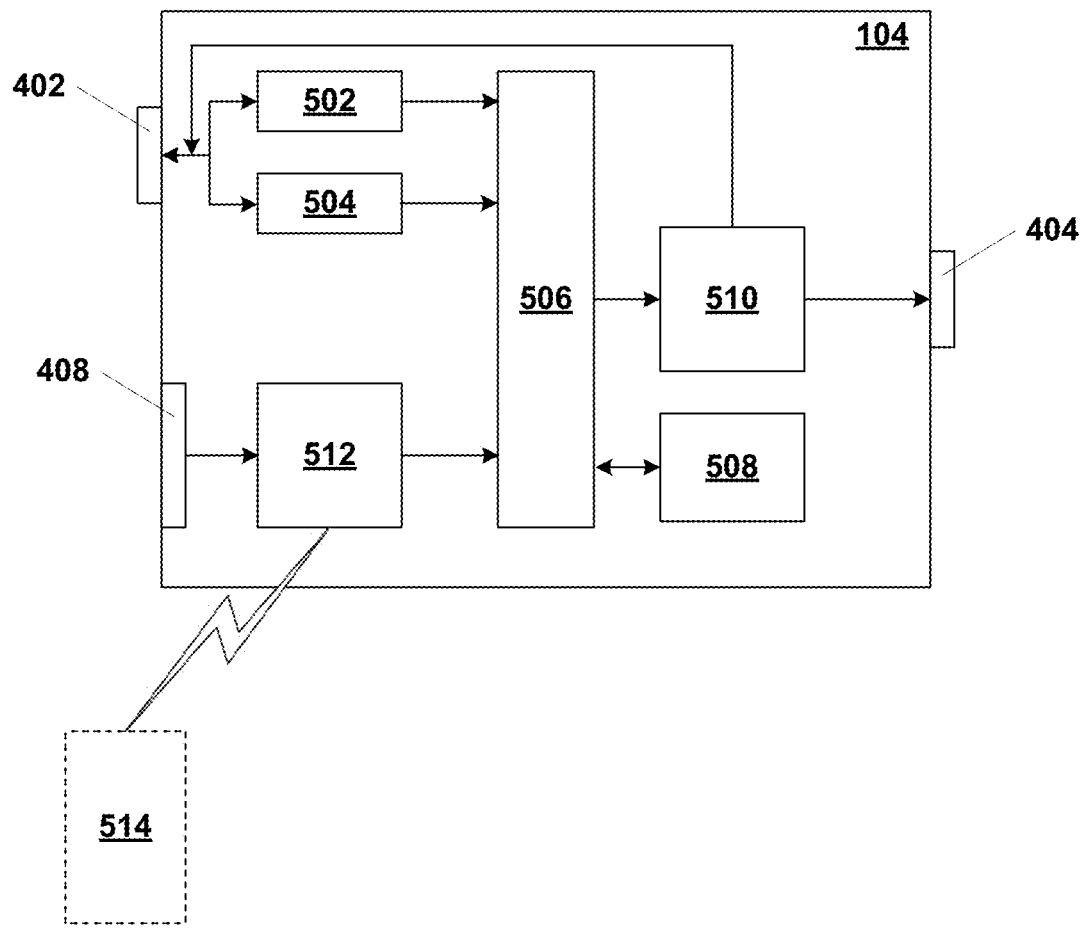
FIG. 5 illustrates, in simplified form, a functional block diagram of a representative MCU, such as the MCU of FIG. 4.

FIG. 5 illustrates, in simplified form, a functional block diagram 500 of a representative MCU, such as the MCU 104 of FIG. 4.

As shown in FIG. 5, the MCU 104 includes shutter signal decoder circuitry 502 and frame timing decoder circuitry 504, one or more processors 506 (which may be a microprocessor and/or microcontroller), storage 508, which may include RAM and/or ROM for, for example, storage of programming, operational control and setting information, and/or other data to be used for or during MCU operation. As with a TMP, depending upon the particular implementation, received information in the storage 508 can have been written therein by the one or more processors and/or microcontrollers 506 or stored therein by the decoder circuitry 502, 504 (and/or other circuitry) via known direct memory access ("DMA") or other data transfer to storage techniques.

The shutter signal decoder circuitry 502 and frame timing decoder circuitry 504 take the information received from a cinematic camera regarding, for example, the frame rate and shutter angle settings and other timing, and provide it to the one or more processors 506. The one or more processors 506 are coupled to an interface 510, via which, based upon the received timing and shutter angle information, the one or more processors 506 will provide various settings to the TMP 102 and synchronize the TMP 102 operation with that of the cinematic camera, via the output port 404, as well as, in some implementations, send signals back to the cinema camera to cause it to capture an image during the blanking period of a frame, as described herein via the I/O 402.

User input, provided via the controls 408, will be provided, via an interface 512, to the one or more processors 506, and/or stored in the storage 508 for use by the one or more processors 506. Such user input, such as timing marker specifications (e.g., color, shape, brightness level, etc.) are then sent to the TMP 102 over the wired or wireless link as appropriate for the particular implementation. Optionally, as noted above, irrespective of whether the MCU 104 is a separate device or part of a TMP 102, the MCU 104 can have an associated, separate, remote control unit 514 can be used (depending upon the implementation, in addition to, or instead of, the controls 408, to allow for input or changing of settings from a distance.

Figure 6:
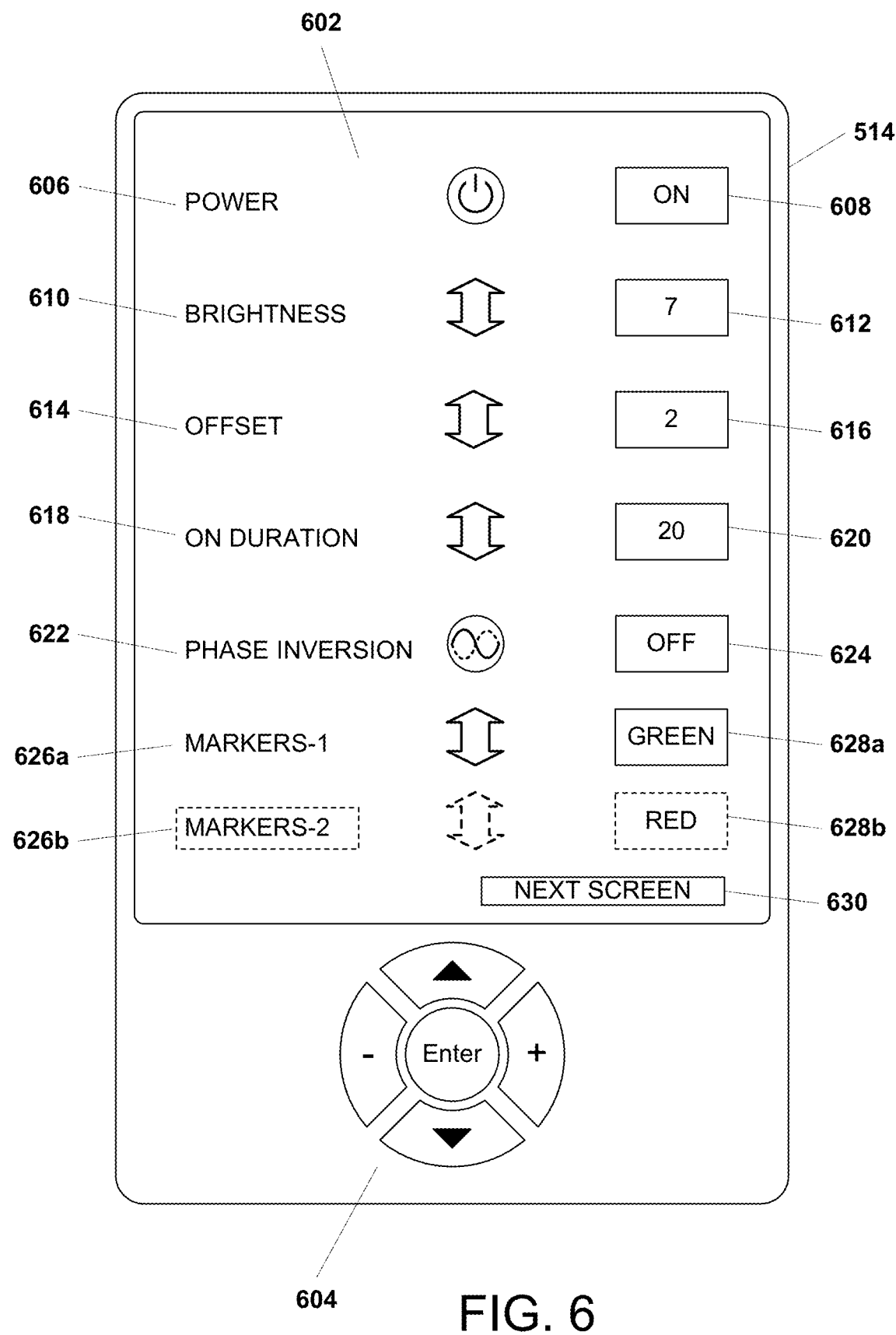
FIG. 6 illustrates, in simplified form, a representative example of the optional remote control unit component for an MCU.

FIG. 6 illustrates, in simplified form, a representative example of the optional remote control unit 514 component for an MCU. As shown, a display 602 of the remote control 514 is displaying one example screen of settings of the TMP 102. Note here that the information displayable on the remote control 514 will typically be the same as will be displayable on the MCU 104 display 410, although the form or format may differ. In addition, in some implementations, the remote control may also be able to display (and/or control) some or all of the information that can be displayed on the TMP 102 display 212.

The remote control 514 includes simplified controls 604 that enable a user to navigate through the display, for example, as shown, by maneuvering up and down through the displayed items, using the "Enter" key to select an item for changing and to accept a changed value, and to use the "plus" and "minus" keys to change the value of the selected item. Alternatively, the remote control can have a touch screen, or can have one or more mechanical controls, for example, knobs, switches, dials, etc. In some specific cases, the remote control need not be a specific dedicated device, but rather it can be implemented in software as an application running on, for example, a laptop/notebook/tablet computer, or smartphone.

As shown, the displayed screen of the remote control 514 includes a power button setting 606 that allows an operator to turn all of the tracking markers of the TMPs 102 coupled to the MCU 104 on or off 608, a "Brightness" control 610 to adjust the brightness level 612 of the projected tracking markers, an "Offset" control 614 that allows a user to manually override the pre-programmed settings of the TMP 102 and/or MCU 104 and adjust the T_offset value 616 (representing a time delay before start of the tracking marker projection within the blanking intervals of subframes of a shot) and an On Duration control 618 that allows a user to manually override the pre-programmed settings of the TMP 102 and/or MCU 104 and adjust the T_on value (representing the amount of time that the tracking markers are displayed within the blanking interval), as will each be described below. In addition, in some implementations, the Offset control 614 and/or the On Duration control 618 can be set to "Auto" on the remote control 514, if previously manually set, which will cause the pre-programmed settings of the TMP 102 and MCU 104 of the T_offset and T_on values to apply.

As shown, the display screen also includes a "Phase Inversion" control 622 that affects what will be displayed on a monitor by shifting what is sent to a monitor by a time value of the subframe timing plus the T_offset amount such that subframes containing the tracking markers will be displayed on a monitor, rather than the subframes without the tracking markers. Note here that, in some cases, involving certain shutter angles (alone or in combination with some frame rates), this will result in choppy/flickering display and, in some other cases, an inability to display the subframes with tracking markers at all.

Optionally, if multiple color or shape tracking markers are available, the display screen can include one or more "Markers" controls 626a, 626b that can be used to select the specific desired color(s) and/or shape(s) for projected tracking markers. As shown, the remote control 514 is for a single TMP 102 that includes at least two different colors 628a, 628b for projectable tracking markers.

Finally, as shown, the displayed screen includes a selectable button 630 that allows one to navigate to a subsequent screen (if any).

Figure 7:
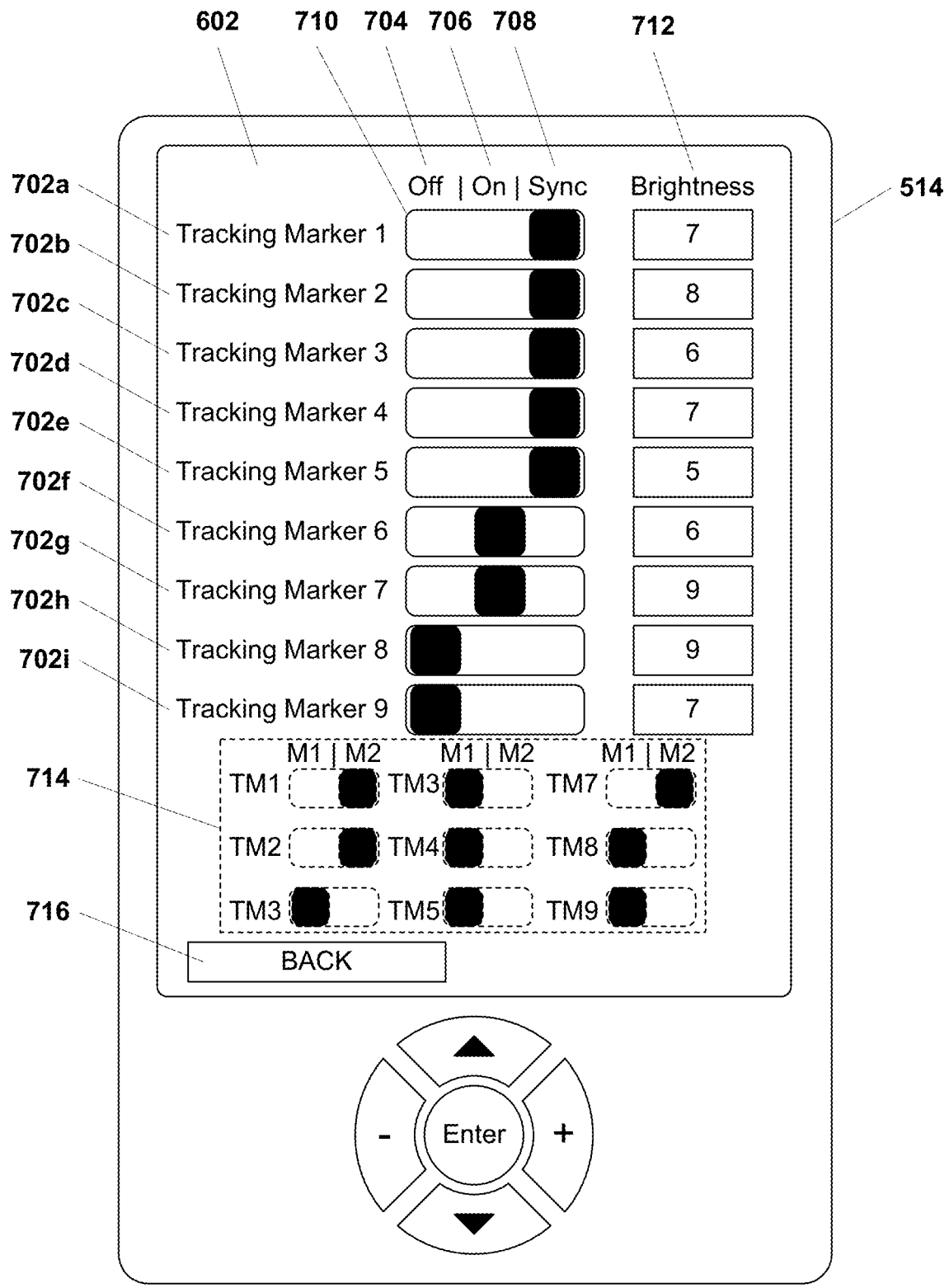
FIG. 7 illustrates, in simplified form, an additional or alternative screen displayed on the display of the optional remote control unit of FIG. 6.

FIG. 7 illustrates, in simplified form, an additional or alternative screen 702 displayed on the display 602 of the optional remote control unit 514 of FIG. 6 by selecting the "Next Screen" button 626, although the same information could additionally, or alternatively, be displayed on the display 410 of the MCU 104.

As shown in FIG. 7, this screen on the display 602 allows a user to specifically control the settings for the individual tracking markers which, as shown for purposes of understanding and illustration only, correspond to the nine outputs 202 of the TMP of FIG. 2.

As shown in FIG. 7, each identified tracking marker 702a-702i can be switched among an always off position 704, an always on position 706, or to be synchronized to the shutter of a cinema camera 708, by moving the buttons within a slider 710 among three positions, and the brightness 712 of each can be individually set as well.

Providing individual settings provides distinct advantages over conventional tracking markers placed onto a green screen or blue screen background. First, being able to turn individual markers constantly "ON", coupled with the swivel joints 204 aids the placement of the tracking markers during the setup process. Second, the ability to leave a select number of tracking markers constantly "ON" can also provide a location reference to aid in tracking marker position interpolation during compositing for film sequences shot with fast and/or shaky camera movement in a composite environment. Third, being able to turn individual markers to "OFF" allows for quick and easy reduction in the number of tracking markers for a given shot. Fourth, individual brightness controls allows the brightness of individual tracking markers to accommodate different lighting conditions overall, or within part of the film set, as well as for brightness variations in the projected tracking markers themselves.

With remote controls that work with TMPs 102 that include changeable tracking marker colors and/or shapes, the remote control can also include "Selection" controls 714 that allow selection of color (by selecting M1 or M2 corresponding to the "Marker-1" and "Marker-2" color selection on the screen of FIG. 6) for each individual tracking marker 702a-702i. Likewise, the remote control 514 can allow for selection of different tracking marker shapes for individual tracking markers.

Finally, since, with this implementation, there is no subsequent screen available following the screen of FIG. 7, the screen only includes a "Back" button 716 that, when selected, will return the user to the screen of FIG. 6, Cinematography Camera As noted above, our approach is intended to be used with cinematography cameras that allow for changing of the frame rate and shutter angle. In some implementation variants, we make use of the ability to trigger image acquisition by the camera's sensor(s) during the blanking interval of each frame, whereas, in others, we purely use a frame splitting approach as described herein.

Wireless Synchronization Between the MCU and TMP

In order to turn the TMP 102 on and off at precisely the right moment, the TMP 102 must be synchronized to the MCU 104 which is reading the timing signals from a camera 106 (or a signal generator). While this is easily done using a wire cable to transmit a simple pulse signal, when using a wireless system, such as a radio frequency or infrared data link, there may be additional latency caused by buffering, processing, and medium access control that must be compensated for. For implementations of TMPs and MCUs that make use of wireless communication, instead of wired communication, the following approach to compensating for that latency can be used.

Data from the MCU 104 is transmitted to a processor or microcontroller or signal generator, within, or external to, the TMP 102, so as to generate a free-running pulse signal to control the on-off state of the light source(s). The timing measurements are typically performed by the MCU 104, which then transmits them to the TMP(s) 102 so that it can generate a free-running pulse signal. That free-running pulse signal advantageously allows the TMP(s) 102 to continue operating during filming if the wireless link between the MCU 104 and TMP 102 is temporarily lost. The frame sync signal of a camera 106 is read by the MCU 104 and wirelessly transmitted to the TMP 102. After the signal periods of the MCU 104 and TMP 102 are matched, a signal is transmitted to match the signal phases. When both the periods and phases of the TMP 102 and MCU 104 are matched, the signals will be synchronized. Nevertheless, the periods and/or phases will drift apart over time due, to mismatches between the clock oscillators driving the MCU 104 and the TMP 102. Therefore, the two circuits should periodically be resynchronized.

Figure 8:
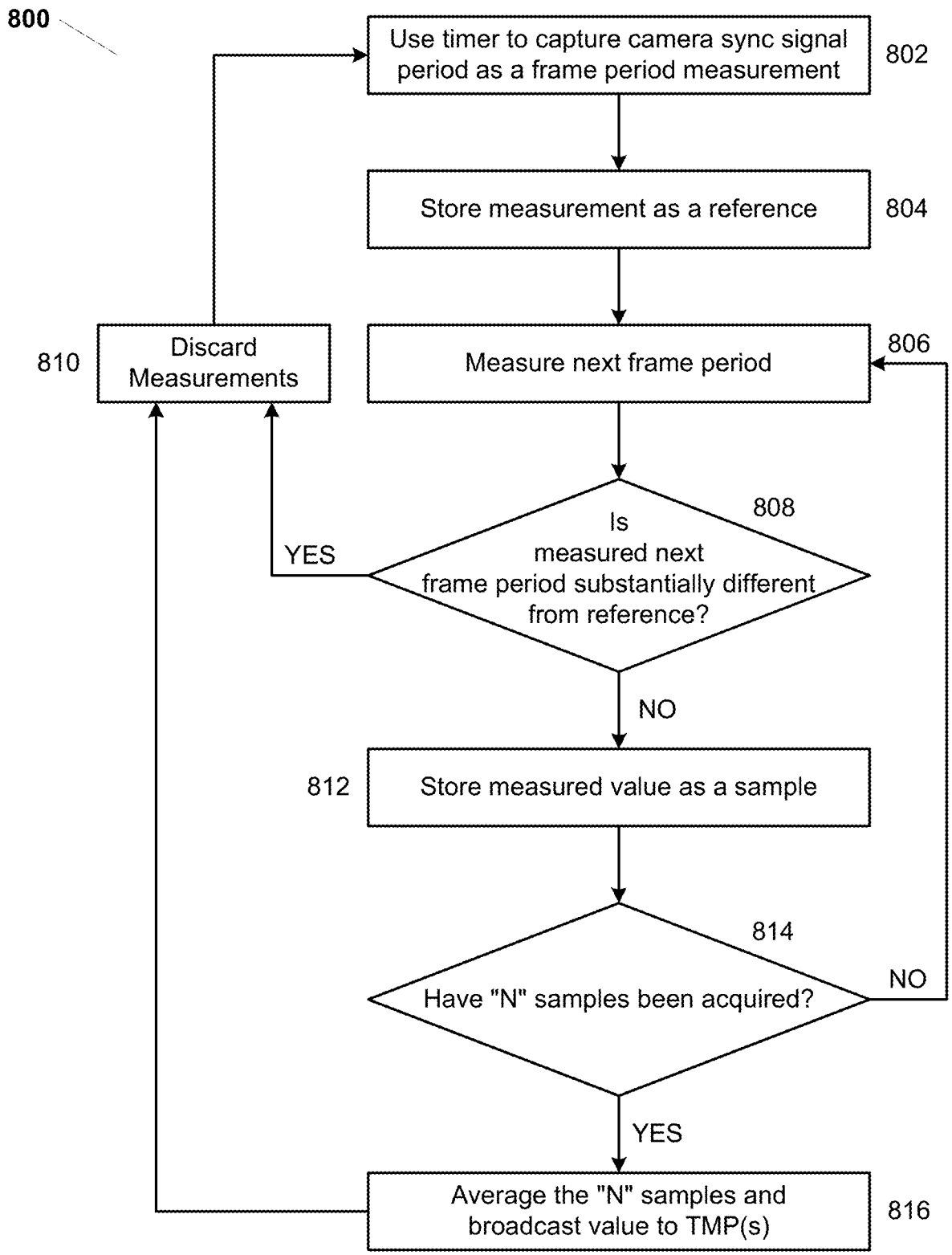
FIG. 8 is a flowchart of an algorithm performed by an MCU for measuring and averaging the frame period.

FIG. 8 is a flowchart 800 of an algorithm performed by an MCU 104 for measuring and averaging the frame period. The averaged frame period calculated by the MCU 104 will then be transmitted to the TMP 102.

Referring now to FIG. 8, first, the timer is used to capture the camera synch signal period for use as a frame period measurement (Step 802) and stores this measurement as a reference (Step 804). Next, a new measurement is taken (Step 806) and compared with the reference (Step 808). If the difference between the two samples is more than a predetermined threshold, the samples are discarded (Step 810) and the process restarts by returning to Step 802. This prevents any temporary glitches (for example, one that might be caused by a loose wire) from disrupting the timing measurement. If the difference between the two samples is less than a predetermined threshold, the measurement is stored (Step 812). This process is repeated until a number "N" samples have been acquired. So, in Step 814, if there are fewer than "N" samples, the process returns to Step 806. If the desired number of samples "N" have been acquired, they are averaged to find the period, and this period is broadcast to the TMP 102 (Step 816); this minimizes the effect of jitter in the measurement. The data is all then discarded (Step 810) and the process returns to Step 802.

Figure 9:
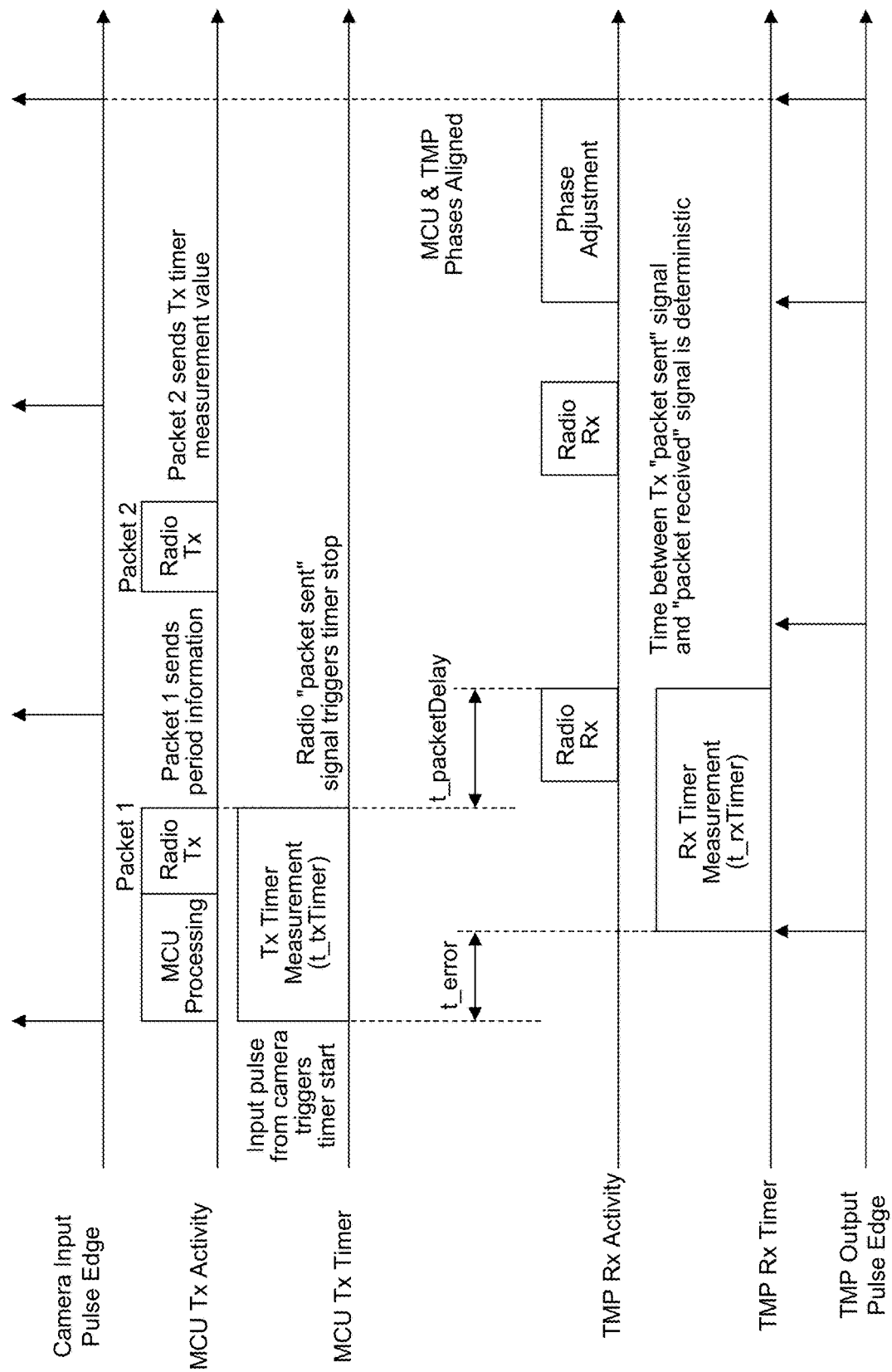
FIG. 9 illustrates, in simplified form, a representative example of a time synchronization protocol suitable for use with our approach and RFM69 modules.

To synchronize the phases, we use a method similar to the Flooding Time Synchronization Protocol described in M. Maroti, B. Kusy, G. Simon and A. Ledeczi, "The Flooding Time Synchronization Protocol", Proceedings of the 2nd International Conference on Embedded Networked Sensor Systems (SenSys '04) pp. 39-49 (2004) that has been modified to work with commonly commercially available RFM69 radio modules and software that do not have capability to timestamp a packet right before transmission as described in the paper. Instead, with our protocol for the RFM69, we timestamp a signal from the radio module that indicates the completion of a transmission, and send a follow-up packet to relay the information. FIG. 9 illustrates, in simplified form, a representative example of a time synchronization protocol suitable for use with our approach and RFM69 modules.

With reference to FIG. 9, the protocol works as follows:
The phase difference, terror is the time that is to be calculated. Once this error is known, the receiver can adjust the phase to synchronize the pulses. At the start of an incoming pulse from the camera, the transmitter's processor/microcontroller starts a timer (Tx Timer) and sends a packet to the transmitter's buffer for transmission (Radio Tx). The time that the packet remains in the transmitter's buffer is variable, however, the transmitter will send a voltage signal to indicate the completion of a transmission. Upon receipt of this voltage signal, the processor/microcontroller stops the Tx Timer. On the receiving end, at the TMP, the processor/microcontroller of the TMP starts a timer (Rx Timer) at the beginning of an output pulse. The TMP's receiving radio module sends out a voltage signal to indicate the receipt of a packet, and the processor/microcontroller of the TMP stops the Rx Timer upon receiving this signal. The time delay between the packet transmission signal of the MCU and the packet receipt signal of the TMP is deterministic and consistent to within a few microseconds. After the first packet is sent, the MCU follows up with transmission of a second packet that transmits the Tx Timer measurement (t_txTimer). When the TMP receives the second packet, it is able to calculate t_error according as follows:

$$t\_error = (t\_txTimer + t\_packetDelay) - t\_rxTimer.$$

Based upon the calculated t_error, the TMP can then adjust the phase of its output pulse signal to align it with the MCU pulse signal.

Figure 10:
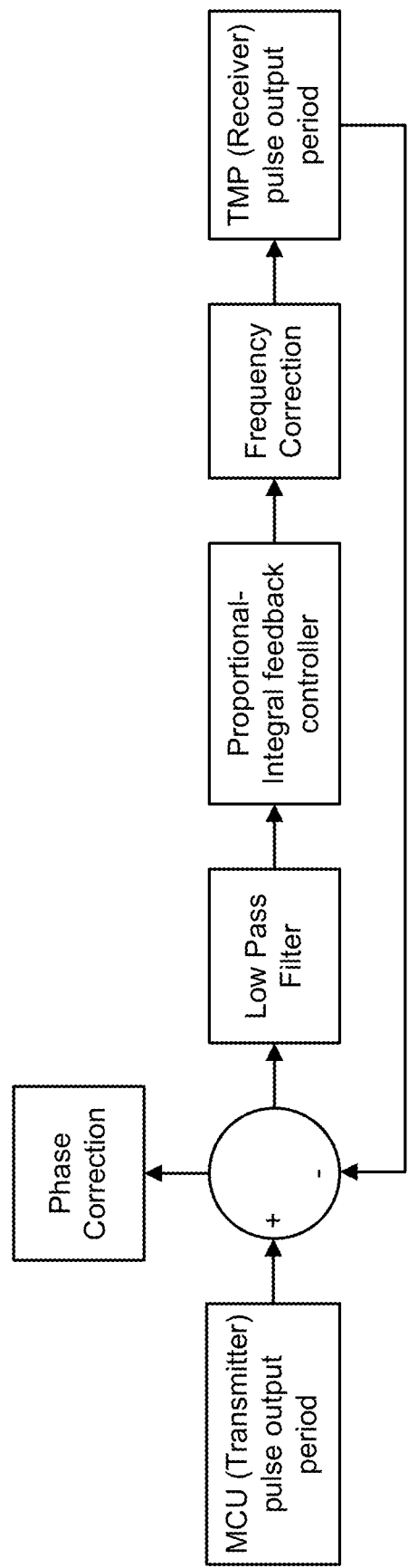
FIG. 10 illustrates, in simplified form, a control loop to compensate for oscillator clock mismatch, FIG. 11 and FIG. 12 each illustrate, in simplified form, timing for two frames of a shot filmed using one variant type of our approach.

To further improve the timing accuracy, a control loop can be used to compensate for a mismatch in clock oscillator frequencies. FIG. 10 illustrates, in simplified form, a control loop to compensate for oscillator clock mismatch.

The phase correction values calculated from the synchronization protocol are fed through a digital low pass filter to reduce jitter, and a proportional-integral feedback controller will attempt to minimize the phase correction needed during the resynchronization cycle by making small adjustments to the period of the output pulse signal.

Having described the various components usable in different phases of our solutions, various implementation variants involving the interaction of the foregoing components to create a shot will now be described.

In addition, it is noted and should be understood that, although the following variants are described with reference to digital film cameras, the variants are equally applicable to variants where the cinema cameras use physical film, the following variant types being independent of the media on which the images are contained.

First Type Variants

Figure 11:
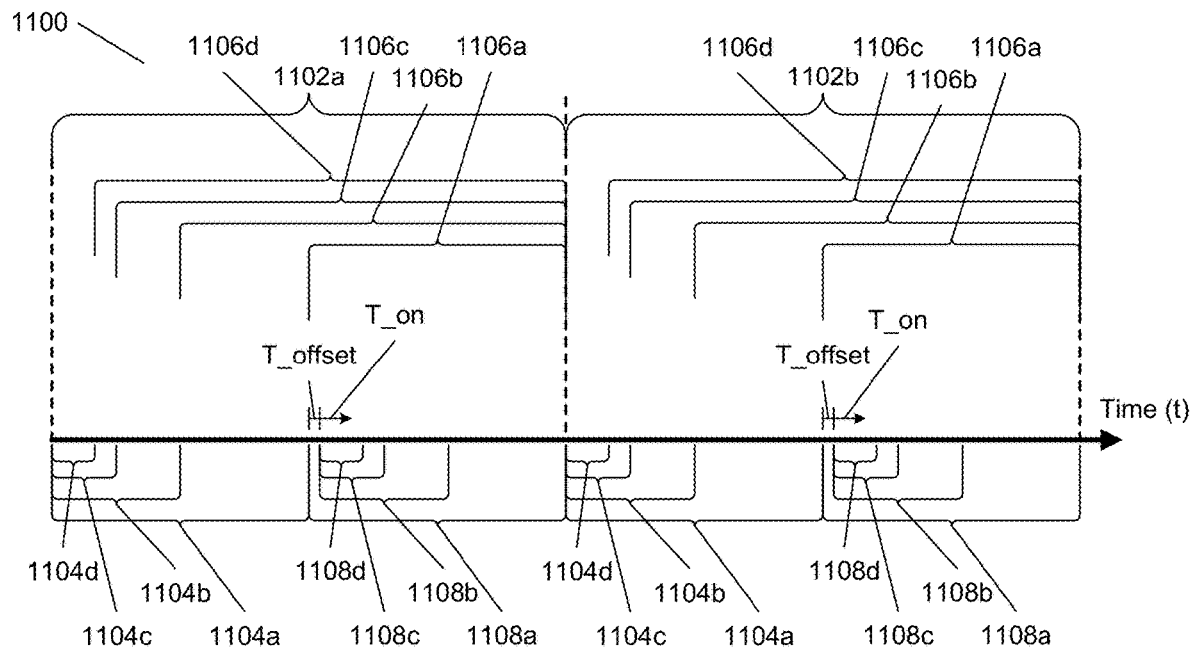
Figure 12:
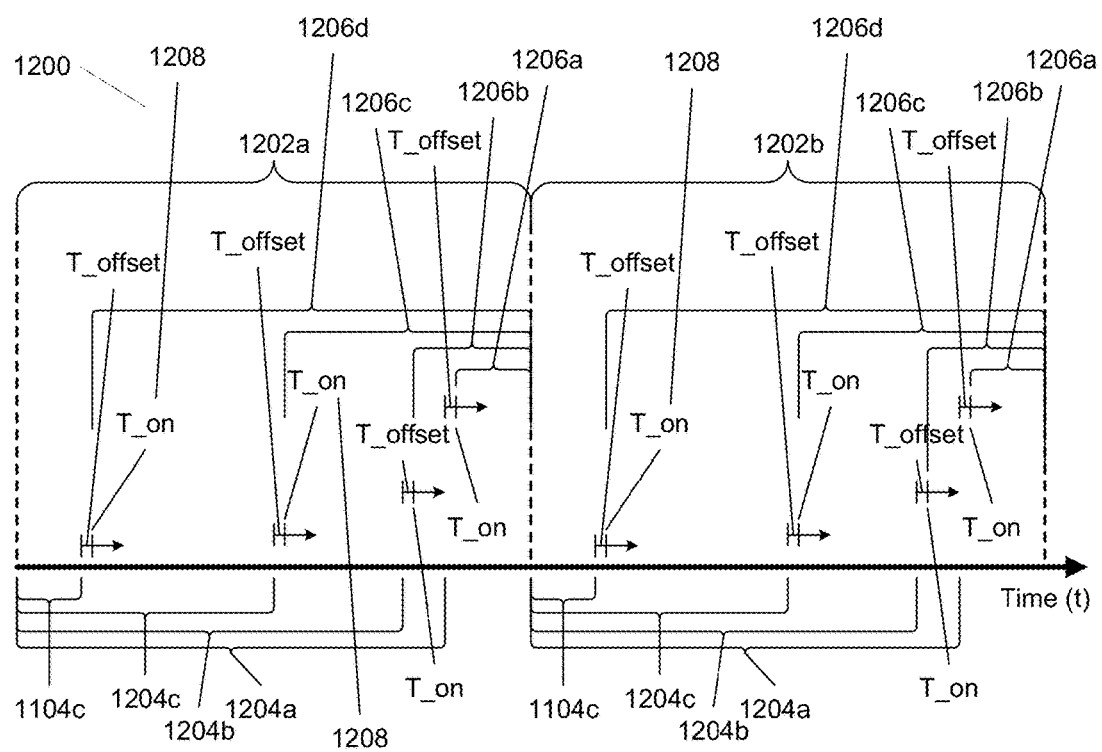

FIG. 11 and FIG. 12 each illustrate, in simplified form, timing for two frames of a shot filmed using one variant type of our approach, FIG. 11 involves a shot 1100 including, among others, the two frames 1102a, 1102b shown, for purposes of describing shots with a shutter angle of less than 180 degrees, and FIG. 12 involves a shot 1200 including, among others, the two frames 1202a, 1202b shown, for purposes of describing shots with a shutter angle of between 180 degrees and at least 300 degrees (actually up to a shutter angle of 360 degrees less a combination of the offset time (T_offset) and the desired time the tracking markers will be on (T_on)) as will be described below.

For further simplicity, the creation of the shot according to these type variants will be explained, using FIG. 11, for commonly used shutter angles of 180 degrees, 90 degrees, 45 degrees and 30 degrees, and using FIG. 12, for shutter angles of 270 degrees and 300 degrees, although the same approaches will work for any arbitrary shutter angle where:

Shutter Angle<([360 degree shutter angle time]−[$T\_offset+T\_on$]).

Turning now to FIG. 11, FIG. 11 shows the two sequential frames 1102a, 1102b from the sequence of frames making up a shot filmed with a cinematic camera in a composite environment using components employing one variant of our first type approach at, for purposes of explanation only, the most commonly used frame rate of 24 fps.

Thus, as shown in FIG. 11, each frame 1102a, 1102b has a duration of 1/24 of a second. Accordingly, for these shutter angles, the duration of image capture 1104a, 1104b, 1104c, 1104d and corresponding blanking intervals 1106a, 1106b, 1106c, 1106d are shown in Table 1 below.

TABLE 1

| Shutter Angle | Image Capture Duration | Blanking Interval Duration |
|---|---|---|
| 180 | 1/48 sec. (0.0208 sec.) 1104a | 1/48 sec. (0.0208 sec.) 1106a |
| 90 | 1/96 sec. (0.0104 sec.) 1104b | 3/96 sec. (0.0313 sec.) 1106b |
| 45 | 1/192 sec. (0.0052 sec.) 1104c | 7/192 sec. (0.0365 sec) 1106c |
| 30 | 1/288 sec. (0.0034 sec.) 1104d | 11/288 sec. (0.0383 sec.) 1106d |

In overview, with these variant types we "split" the frame into two portions: i) a portion with the image as normal, and ii) a portion within the blanking interval. In the description that follows, we refer to the normal image portion of a frame (which typically will include no tracking markers or, in some special cases a few "constant on" tracking markers) as a "primary image" and, in these variant types, the blanking interval portion (which will include an image with tracking markers) as a "tracking image." Because, with these variant types, each frame contains a primary image followed by a tracking image, each primary image of the shot (except the very first primary image) will be preceded and succeeded by a tracking image. As a result, the filming camera's viewpoint during a primary image can be approximated or interpolated using the tracking marker locations in the preceding and succeeding tracking images. This allows the tracking images to be used during post-production to properly composite the to-be-inserted image into the primary image without the need to remove tracking markers. Then, the tracking images are removed from the final video stream in post production using any approach that accomplishes the task such as, for example, simply removing the tracking image subframes, leaving only the primary image subframes—which requires minimal time and simple procedures, and maintains the frame rate. Since the primary images do not have any tracking markers, the procedures (and, hence, time, skill and cost) normally used for removing tracking markers are no longer necessary.

Of course, it will be recognized that the capturing of images (containing the tracking markers) during the blanking interval will require additional storage (which could be up to twice as much or more, depending upon storage format and/or codec) for the additional image data, however, suitable commodity storage is inexpensive overall (currently $0.05/GB or less and continuing to drop), and, when compared to the cost savings from not having to remove tracking markers, the increased storage cost is trivial.

In order to synchronize a TMP 102 output with the video stream frames, the TMP 102 must receive a signal directly (or indirectly via the MCU 104) from the camera 106, or from a signal generator that is synchronized with the frame acquisition by the camera 106. This can be a signal that contains camera shutter or imager state information (e.g., an electronic pulse from the camera directly indicating the shutter or imager state), video stream timing information (e.g., "SMPTE timecode" or "Genlock"), or frame synchronization measured from a video stream itself (e.g., deriving imager state from a high-definition video feed). The signal from the camera 106 or signal generator is decoded to calculate when each frame acquisition will start, so that the TMP 102 can be put into the correct state when the camera is acquiring an image or in the blanking interval. When the camera 106 is acquiring a "primary" image, the tracking markers are off, and at some point after the start of the blanking interval (during the identified tracking marker windows 1108a, 1108b, 1108c, 1108d), the camera sensors will be triggered to capture tracking image data. Within that period, tracking markers will be turned on and then off, with the turning on occurring no earlier than some offset following the end of the primary image acquisition, and turning off occurring at a time no later than the end of the blanking interval. This process repeats for each frame.

Returning now to FIG. 11, FIG. 11 shows the windows 1108a, 1108b, 1108c, 1108d for the tracking markers in relation to the frame start for one variant type. Two timing parameters, T_offset and T_on, are used to adjust the timing of when the tracking markers are turned on during the blanking interval. With this variant type, involving shutter angles equal to or less than 180 degrees, T_offset adds a timing offset at the end of the first ½ of the frame period, after which the tracking markers will be turned on for a duration T_on and then turned off at or before the end of the blanking period. The resulting tracking image will later be used to calculate the transformations necessary to generate a to-be-inserted background with its movement matching the primary images. This process will be familiar to visual effects artists involved in match moving, with the only difference being that the tracking calculations will be done using the tracking images and the compositing will be performed on the primary images using that data. The tracking markers can be turned on for any duration shorter than the window duration less T_offset, where shorter durations reduce motion blur of the tracking markers and longer durations increase the rendered exposure of the tracking markers. In general, for frame rates of 24 fps, the tracking markers can be turned on for a short duration of less than about 21 milliseconds ("mS") (actually timed as 20.83 at 24 fps), e.g., around half the blanking interval duration, to as short as is needed while ensuring that the light source brightness is stable before capturing, e.g., presently considered to be about 0.5 mS. In this way, tracking marker blur due to camera movement is reduced or eliminated. In general, T_on will be less than 15 mS and, more specifically, can range from between 12 mS and 8 mS for this approach, where marker blur is acceptable, and between 3 mS and 0.5 mS where tracking marker blur is less acceptable. Of course, it will be understood that other T_on durations between 15 mS and 12 mS, as well as durations between 8 mS and 3 mS, can also be used. For faster frame rates, it will be appreciated that shorter T_on durations (i.e., less than 0.5 mS can be used), but the foregoing guide for T_on (i.e., tracking marker brightness stability) will be applicable.

With some of these variant types, i.e., those where the shutter angle is less than 180 degrees and where the timing marker "on" duration approaches or is equal to the image capture duration, they only work for image capture durations that are less than the duration of a 180 degree shutter angle minus T_offset. This is because, otherwise, the duration the tracking markers would be "on" would extend beyond the start of the next frame.

Turning to FIG. 12, FIG. 12 shows an alternative variant type that addresses this problem for implementations that may want to use shutter angles of 180 degrees 1204c or more, for example, 300 degrees 1204a, 270 degrees 1204b, 180 degrees 1204c.

With these variant types, the timing offset (T_offset) is added to the start of the blanking interval 1206a, 1206b, 1206c, 1206d, whenever it starts, after which activation of the tracking markers will be initiated. Again, T_on 1208 determines the duration that the tracking markers are active, provided the duration is no longer than (½ the frame rate duration of any shutter angle less than 180 degrees) minus (T_offset) and, for shutter angles of 180 degrees or more, the tracking markers can be active for a time that is no more than the blanking interval duration less T_offset.

In both the variants of FIG. 11-12, T_offset can be adjusted to compensate for latency and provide margin for jitter between the signal and the actual shutter timings, and can be a positive or negative value. The setting for T_on is adjusted to ensure that the tracking markers are turned off before the start of the next frame, thereby providing a margin for any timing jitter or inaccuracies in the system. Moreover, and advantageously, for monitoring or playback, T_offset may be adjusted for a feed to a monitor so that, depending upon the T_offset setting, the video feed can show only the primary images or only the tracking images.

For shots that will involve jerky camera movements, because we are sampling the motion path of the camera with the tracking images, when the motion of the camera contains frequency components that reach or exceed the Nyquist frequency, the reconstructed motion path will contain imperfections caused by aliasing of the higher frequency components. Advantageously, we can mitigate this issue by leaving a few select markers on during both the primary images and tracking images, to serve as a reference to improve the reconstruction of the camera's motion path.

Additionally or alternatively, the time the TMP 102 is on (T_on) can be shortened, from times less than 21 mS, e.g., in the range of 8 mS to 15 mS down to times in the range of between 5 mS and 0.5 mS, to improve tracking for fast or shaky shots. By reducing the duration that the tracking markers are on, tracking marker motion blur can be reduced.

At this point, it should be noted that the foregoing variant types rely upon use of cinema cameras that allow an externally supplied signal(s) to trigger the sensors to turn on and off for an arbitrary duration, so as to capture image data within a frame during the blanking interval at a given frame rate setting. Since some cinema cameras do not have this capability, we have devised alternative variant types that do not require this aspect. Advantageously, some implementations of these further variant types can yield results that are actually superior to the foregoing first variant types. Moreover, it is to be understood that, despite imaging during the blanking period, this variant approach can advantageously be performed with a mechanical shutter camera as well, although some advantages will not be achievable.

More particularly, certain 35 mm film cameras and digital cameras include a mechanical shutter in the form of a rotating mirror, positioned at 45 deg angle to the film plane. Conventional shutters in some cameras have, by default, 180 degrees of silver mirror and 180 degrees of open section, although some others are adjustable. As the mirror rotates at the frame rate (which translates to the number of rotations per sec), light captured by the camera's lens passes though the open half of the mirror to either the 35 mm film or digital sensors (depending upon the camera) to expose the film or sensors for a duration of one half the frame rate. Then, the blanking interval begins, and the captured light is reflected by the mirror half of the shutter for a duration of one half the frame rate, and concurrently redirected to the optical viewfinder assembly. As such, by modifying such cameras to include a further digital image sensor (typically CMOS), either in place of the optical viewfinder 112 (e.g., FIG. 1) or in conjunction with the optical viewfinder 112, for example, via a partial beam splitter, that further digital image sensor can be used to capture the image containing the displayed tracking markers during the blanking interval. This further digital sensor should be identical in back focus distance and positional registration to the main sensor (factoring in the light path through the 45 degree mirror shutter), and could have increased sensitivity and/or resolution. Notably, implementations employing this first type variant, with mechanical shutter cameras, would have some advantages over a camera with an electronic shutter. For example, where motion is being captured, cameras that include electronic shuttering produce temporally "square edged" motion blur, whereas a mechanical shutter produces temporally "soft edged" motion blur. Soft edged motion blur has reduced strobing and produces a very pleasing "film" look that renders motion beautifully. Incorporating such a further sensor can be accomplished at a relatively low cost, and, advantageously, for some implementations, can be configured to also provide a digital video output for the optical viewfinder 112 or to a (wired or wireless) interface to a monitor 114a on the camera 106, or a monitor 114b associated with, but remote from, the camera 106. This would allow the tracking markers displayed during the blanking interval to optionally be seen within the viewfinder 112 or on an auxiliary monitor 114a, 114b.

This type of approach could also be straightforwardly implemented in a cinematic camera that shoots on film, or such a camera could be modified to do so. This would involve a modification to existing camera film advance approaches such that the film advance would not be tied to the shutter and the shutter would have a second opening (of short duration) so that, at the start of the normal blanking interval, the film would be advanced very fast such that a new frame of film is positioned, when the tracking marker containing image is acquired during the blanking interval via the second opening, and then the film would quickly be advanced for the next normal image acquisition. In other words, the film's physical frame advance would not be uniform to match the frame rate setting.

Finally, it is to be understood that the result of a use of this variant, at the end of the filming of a shot, a compositable sequence of frames will exist within non-transitory storage associated with the camera 106, each made up of a subframe containing conventional primary image (at least some of which may individually contain a portion of a backdrop but typically no tracking markers) and a subframe containing a tracking image, within the frame's blanking interval (i.e., containing tracking markers within the portion of the backdrop).

Although the foregoing first variant types provide significant advantages over current tracking marker approaches, there is room for approaches that provide even greater advantages in terms of, for example, accuracy and quality.

Second Type Variants

We have devised an alternative approach to the first type variants that is significantly more accurate, although the tradeoff is a requirement for additional storage. However, as noted above, when dealing with the issue of tracking marker removal involving a composite environment, the relative cost of additional storage is trivial compared to the cost savings from eliminating the need to remove tracking markers and the improved accuracy.

In simplified overview, with variants using this type approach, to obtain footage at a desired frame rate and 180 degree shutter angle, the cinematic camera is set to film at quadruple the final intended frame rate and at 360 degree shutter angle. For example, for final footage at 24 fps, the camera would be set for 96 fps at 360 degree shutter angle, for final footage at 48 fps, the camera would be set for 192 fps at 360 degree shutter angle, for final footage at 60 fps, the camera would be set for 240 fps at 360 degree shutter angle, etc. Then as described in greater detail below, for each set of four frames at the quadruple rate, the first and fourth frames become tracking images, similar to those that would appear within the blanking interval of the first type variants, and the second and third frames become image frames (i.e., without the tracking markers) and one or both are the frames from which the final frame rate images are obtained.

Advantageously, in this regard, as will be described below, the final footage will effectively be available at shutter angles of both 90 degrees and 180 degrees.

Figure 13:
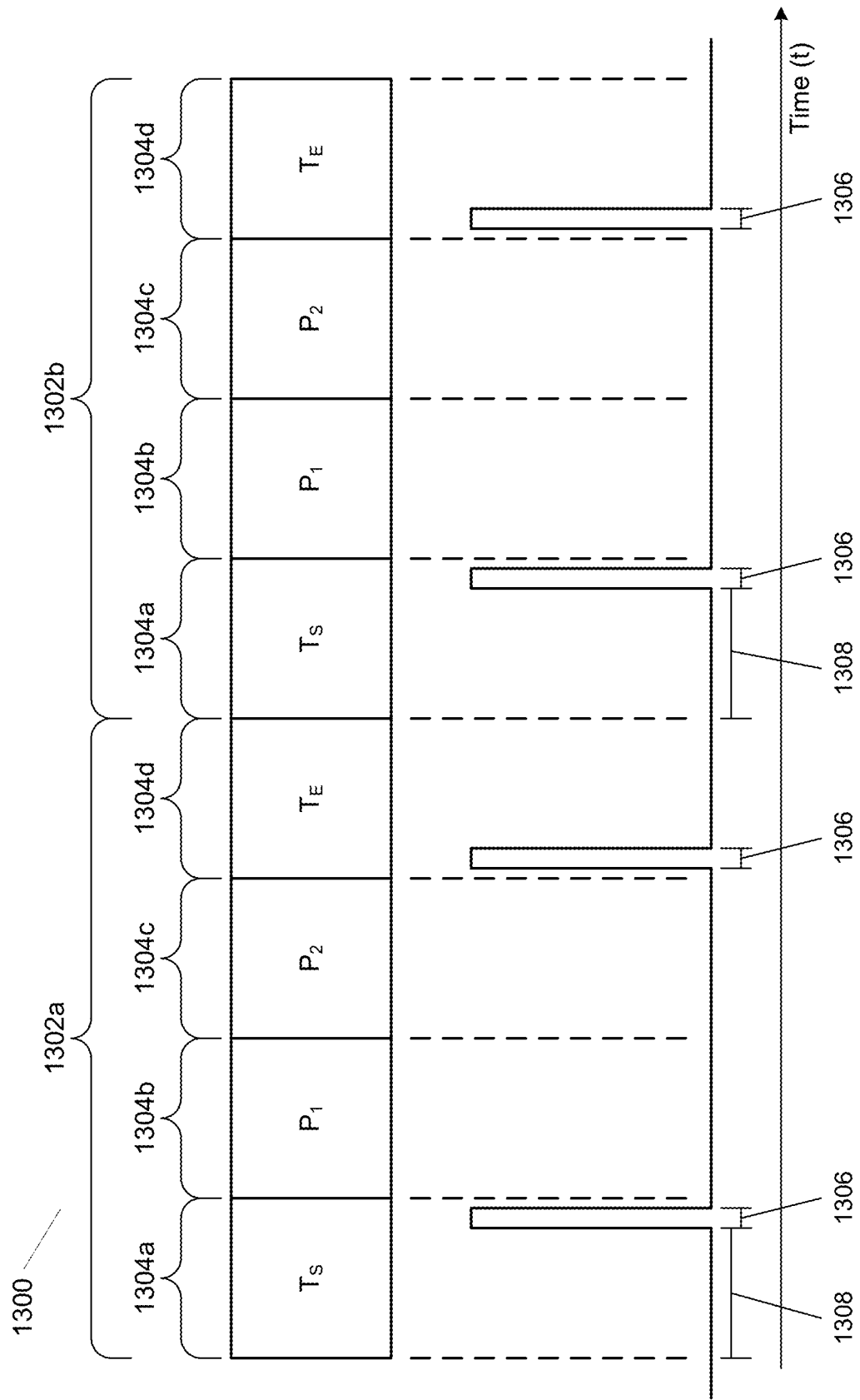
FIG. 13 illustrates, in simplified form, a portion of a sequence of subframes for a shot made in accordance with the approaches of our second type variants.

FIG. 13 illustrates, in simplified form, a portion 1300 of a sequence of subframes for a shot made in accordance with the approaches of our second type variants. More particularly, FIG. 13 shows two sequential virtual frames 1302a, 1302b, respectively made up of a sequence of actual quadruple frame rate "subframes" 1304a, 1304b, 1304c, 1304d, that were filmed with a cinematic camera in a composite environment using example implementations of an MCU and at least one TMP, both as described herein.

As shown, during filming, the first ($T_S$) subframe 1304a and last ($T_E$) subframe 1304d are used to capture images with tracking markers displayed, with the two subframes 1304b, 1304c in between ($P_1$ & $P_2$) being primary image type frames (i.e., containing no tracking markers). However, in contrast to some variants of the first type described above, for the very first ($T_S$) subframe 1304a, the time the tracking markers will be displayed (T_on) 1306 is intended to be very short (but long enough to ensure brightness stability) and they will be set at a brightness level that will not overexpose the sensors of the cinematic camera. For most filming, the T_on should be of a duration long enough for a rolling shutter to capture the tracking markers or, in the case of non-rolling shutters, long enough for the camera to acquire the tracking markers in the acquired image. In addition, T_on should start at a specified point (T_offset) 1308 as close to the end of the frame timing as possible that will reliably ensure that the tracking markers will be off before the start of the next subframe. The next two ($P_1$ & $P_2$) subframes 1304b, 1304c are frames with no tracking markers. Then, immediately at the start of the fourth subframe ($T_E$) 1304d, a few milliseconds or less (e.g., less than 3 mS), the tracking markers are again turned on for the same short duration (T_on) as used for the first subframe 1304a. This process repeats for each group 1302 of four subframes 1304a, 1304b, 1304c, 1304d so that, when the shot is complete, the shot will be made up of a repeating sequence of the subframes 1304a, 1304b, 1304c, 1304d, with the middle two ($P_1$ & $P_2$) subframes 1304b, 1304c being closely book ended by tracking marker-containing subframes 1304a, 1304d. By minimizing the time delay between the primary image subframes P1 & P2 and projection of the tracking markers 1306, with these second type variants, the filming camera's position and rotation motion path, from its viewpoint during the middle two ($P_1$ & $P_2$) subframes 1304b, 1304c or during only the first ($P_1$) subframe 1304b can be very accurately approximated or interpolated using the tracking marker locations in the preceding and succeeding subframes 1304a, 1304d.

Moreover, with this example (filmed at 96 fps), the first ($P_1$) of the middle two ($P_1$ & $P_2$) subframes 1304b, 1304c, if used by itself (i.e., the first ($P_1$) of the "primary image" subframes 1304b is used and the second ($P_2$) of the "primary image" subframes 1304c is discarded) is equal to a 24 fps frame filmed at 90 degree shutter angle, and a combination of the middle two ($P_1$ & $P_2$) subframes 1304b, 1304c, for example, combined using intensity averaging (if the subframes were filmed with nominal exposure) or by summation of the red-green-blue ("RGB") values in linear color space (if the subframes were filmed underexposed 1-stop due to insufficient light), would be equivalent to a 24 fps frame filmed at 180 degree shutter angle.

The second type variants provide additional advantages over the first type variants.

For example, one advantage that may be achieved by some implementations is that there is no degradation in image quality relative to normal photography at the ultimate frame rate and shutter angle, provided there is sufficient light during filming to allow 1-stop of extra exposure (which would generally be required for shooting 96 fps 360-shutter, as opposed to 24 fps 180-shutter). The generally increased baseline ISO sensitivity of modern sensors in cinematic cameras has rendered the use of neutral density ("ND") filters common, in order to actually decrease light input to the camera's sensors (generally to 50% or 25% transmission or even less) during most normal cinematography with nominally sufficient light levels. Hence when using the approach of our second type variants, the cinematographer can forgo the commonly used ND 3 filter (50% reduction, i.e., 1-stop darker) resulting in an identical exposure to normal filming (i.e., without using any of our variants). If there is insufficient light, a minor disadvantage to our second type variants arises in the form of 1-stop light loss. If the filming is shot in the common RAW format, the primary subframe pairs 1304b, 1304c can readily be recombined by summation in linear RGB color space. This will generally result in the same quality and exposure of the imagery. This is because, in theory, two exposures of 50% each should add up to 100% of the light acquisition. However, as a practical matter for actual cameras, because all sensors have some inherent noise level and the underexposure may put some useful image information under that noise value, two underexposed frames may not equal the total aggregate image of a single, normally exposed, frame over the whole dynamic range of a shot. Nevertheless, the two frames offer an advantage in extended highlight rendition. Also the averaging of two samples can reduce the noise. Thus, it is to be understood that, in some cases, the actual result might be slightly lower quality in some extreme cases (e.g., very dark scenes), and slightly better quality in others (e.g., more highlight exposure headroom). In the worst case, if, for a given shot, the lighting is insufficient, the ISO can be increased by 1-stop.

Another advantage that may be achieved by some implementations is that, since the duration of display of the tracking markers are very short, they are rendered very sharply without, or with minimal, motion blur. Thus, it is mathematically easy for matchmoving software to distinguish and track them relative to tracking markers that are displayed for a whole (or substantially whole) subframe duration, since they are significantly less blurry, because movement shown by conventional tracking markers often involves streaked or blurry tracking markers, and conventional software used to interpolate the cinematic camera's motion may involve compensation for the streak or blurring through selection of some point within the streak or blur, at the beginning, end, or somewhere in between.

Yet another advantage that may be achieved by some implementations is that, using double the tracking markers per ultimate frame, results in a more faithful motion track. Since, due to the existence of the $T_S$ and $T_E$ subframes 1304a, 1304d, there exists both a beginning and an end measurement for what would normally be a single position measurement using some point of potentially blurred tracking markers as is common with conventional tracking marker approaches. Stated another way, the temporal image sampling is effectively doubled, making the filming more robust to faster movements overall, and providing more a faithful representation of high frequency movements & rotations by doubling the samples.

Figure 14:
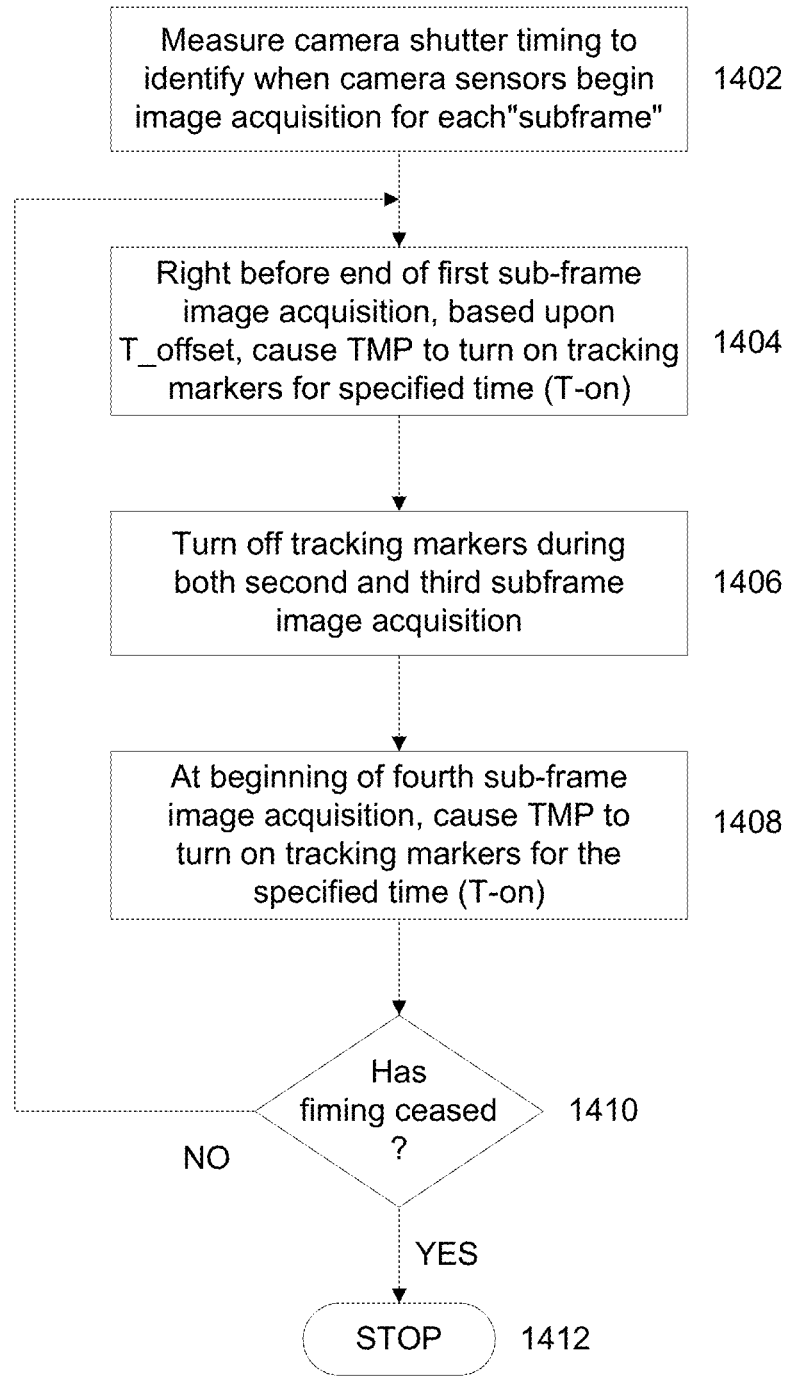
FIG. 14 illustrates, in simplified form, a flowchart for the operation of an MCU for the second type variants.

FIG. 14 illustrates, in simplified form, a flowchart for the operation of an MCU 104 for the second type variants. The operation is as follows.

Once (i) the camera 106 has been set for a frame rate that is quadruple the ultimate intended frame rate and set for a 360 degree shutter angle, (ii) the TMP(s) are set for a suitably short tracking marker display duration (T_on), and (iii) the MCU is aware of the TMP(s) T_on setting, the process begins with the measurement of the timing for when the camera sensors begin image acquisition for each "subframe" (i.e., at the quadruple rate frame) (Step 1402). This can typically be done, before the start of filming, for example, during set up and determining placement of the tracking markers or, for example, during filming of the clapper board (sometimes alternatively called a synch slate or sound marker).

Once that timing measurement has been accomplished, near the end of the first subframe, the MCU signals the TMP(s) to turn on the tracking markers (Step 1404). Then the MCU signals the TMP to turn off the tracking markers and waits for two subframes periods of image acquisition to pass (Step 1406). Then, at the start of the fourth subframe, the MCU again signals the TMP(s) to turn on the tracking markers (Step 1408).

If the MCU receives a signal indicating that filming has stopped, or loses a signal indicating the filming is continuing, depending upon the particular cinematic camera, (Step 1410), the process can end (Step 1412). However, if the filming continues (Step 1410), the process continues to cycle through Steps 1404 through Step 1408, until filming stops.

As a result, at the end of filming, a non-transitory medium will contain a sequence of images captured by a cinematic camera. When a part of the sequence includes part of a composite environment, that part of the sequence will be made up of sequential groups of four subframes of common duration, with each group containing three different types of subframes: (i) a first type that contains an image captured by the cinematic camera for the entire subframe duration along with tracking markers captured milliseconds prior to the end of the first type subframe, (ii) a second type that contains an image captured by the cinematic camera for the entire subframe duration and has no tracking markers, and (iii) a third type that contains an image captured by the cinematic camera for the entire subframe duration along with tracking markers captured beginning milliseconds after the start of the third type subframe. Each group in the sequence will be made up of one first type subframe, followed by two second type subframes, followed by one third type subframe, such that a difference between the tracking markers of the first type subframe and third type subframe represents a movement of the cinematic camera during the second type subframes. Of course, when another part of the sequence does not include any of the composite environment, the four subframes in the groups making up that other part of the sequence will all be second type subframes.

While implementations employing the second type variants have significant advantages, one nominal drawback is that it requires at least twice the storage required by the first type variants, and four times the storage required by conventional approaches.

Advantageously, we have devised a third variant type that provides advantages obtainable using the second type variants, but only typically requires storage size as used with the first type variants (i.e., twice the normal storage).

Third Type Variants

Out third type variants make use of the advantageous ability of some TMPs to project two contrasting tracking markers, for example, tracking markers of different colors and/or intensities from a common output 202, or the ability to use two TMPs that each project different color or intensity tracking markers. The former type TMPs have an advantage in that, since the two different tracking markers will exit a common output 202, they will automatically be aligned. The use of two different TMPs to each different, contrasting, tracking markers allow the individual TMPs to be simpler but require their respective outputs to be carefully aligned, since, during post-processing, any misalignment will be considered to reflect camera movement. For purposes of the descriptions that follow, and ease of understanding the concept, different colors will specifically be used for the contrasting tracking markers, with the understanding that intensity could alternatively or additionally be part of the contrast.

Figure 15:
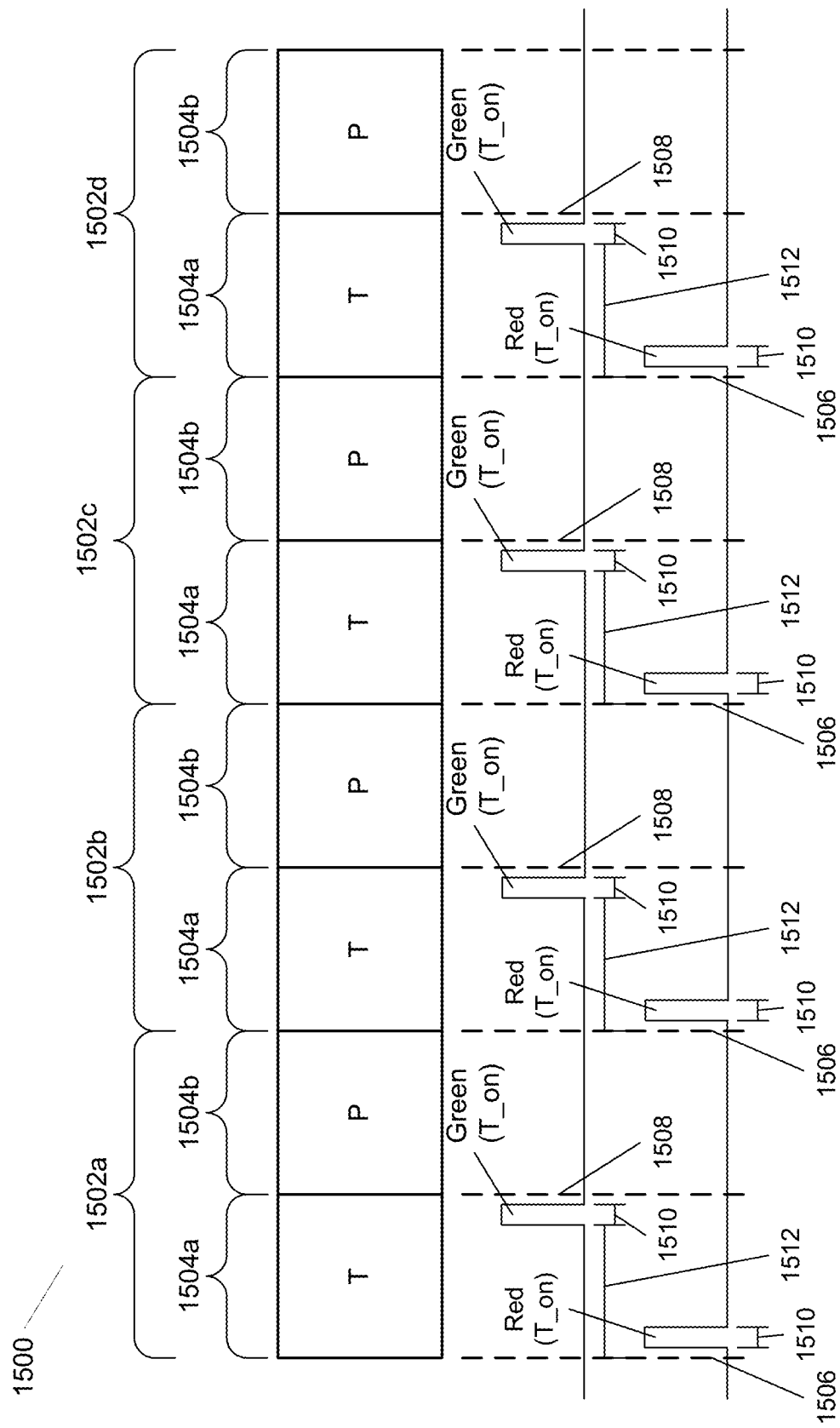
FIG. 15 illustrates, in simplified form, another portion of a sequence of "virtual frames" for a shot made in accordance with the approaches of our third type variants.

FIG. 15 illustrates, in simplified form, another portion 1500 of a sequence of "virtual frames" for a shot made in accordance with the approaches of our third type variants. More particularly, FIG. 15 shows four sequential virtual frames 1502a, 1502b, 1502c, 1502d, each respectively made up of a pair of actual double final frame rate "subframes" 1504a, 1504b, that were filmed with a cinematic camera in a composite environment using example implementations of an MCU and at least one TMP, both as described herein. For example, for an ultimate shot at 24 fps and 180 degree shutter angle, the subframes are shot at 48 fps and 360 degree shutter angle, for an ultimate shot at 48 fps and 180 degree shutter angle, the subframes are shot at 96 fps and 360 degree shutter angle, for an ultimate shot at 60 fps and 180 degree shutter angle, the subframes are shot at 120 fps and 360 degree shutter angle, etc.

As shown, one subframe 1504a of each virtual frame 1502a, 1502b, 1502c, 1502d is analogous to a tracking image, as described above, and the other subframe 1504b of each virtual frame 1502a, 1502b, 1502c, 1502d is analogous to a primary image as described above. Similar to the second type variants, these third type variants use short duration (T_on) displays of the tracking markers to delineate the start and end of a primary image. However, unlike the second type variants, separate, discrete subframes 1304a, 1304d are not used to bookend the primary frame(s). Rather, the tracking markers for the start of the next primary image subframe 1504b and for the end of the prior primary image subframe 1504b appear in the same tracking image. Thus, in order to differentiate between the two, two different, differentiable, tracking markers are used, for example and simplicity of understanding, of two differentiable colors, with one color tracking markers being displayed as close to the start 1506 of a tracking image subframe 1504a and a different color tracking markers being displayed as close to the end 1508 of that same tracking image subframe 1504a, with both having the same short duration (T_on) 1510 (which will typically be of the same duration discussed in connection with the second type variants) and the start-indicating tracking marker turn on (T_on) being offset from the start of that subframe 1504a by a time delay 1512 (T_offset).

By way of one representative example, one simple approach with colors is to use green and red lasers as the light sources for the tracking markers because they are widely commercially available, they comport with the well known convention of green for "start" and red for "stop" and, being primary colors for light, they are easily separable using RGB image channels. Of course, blue is also an available laser color that could be used and is equally separable using RGB image channels. Finally, other color tracking markers could be used provided they are sufficiently different so as to be readily distinguishable from each other and from other colors being filmed in the shot.

Alternatively, instead of using two different color tracking markers, some implementations can use two slightly differentiable tracking markers of the same color, that will not introduce errors or, will introduce errors that are acceptably negligible under the circumstances (e.g., they will not be noticeable to the average viewer in the final composited product). For example, using two slightly different shapes, like a small triangle and inverted triangle, or two small bars of different lengths in a direction that will not be meaningfully affected by the camera's motion in their length direction through enough of the shot to enable visual determination of which are analogous to color of the "start" tracking markers and which are analogous to the color of the "end" tracking markers. This non-color approach would be less robust than using two colors, but would nevertheless be acceptable for some applications.

Still further, another alternative approach for these third type variants would be to project very short duration tracking markers right at the start and right at the end of the tracking frame, with the duration being sufficiently short that they would be discretely differentiable (during camera movement). Although one might not be able to tell from a single tracking frame which was which, the "start" versus "end" tracking markers would be identifiable through looking at multiple sequential frames, provided that the camera movement is not too fast during the shot or too jerky. While this alternative is not as robust as the other third variant approaches described, it has the advantage of allowing for use of a simpler TMP 102, because the projected tracking markers can be the same color or shape.

As a result of using these third type variants, at the end of filming, a non-transitory medium will contain a sequence of images captured by a cinematic camera. When the sequence involves a composite environment, the sequence will be made up of sequential subframes of common duration, grouped in pairs, with each pair in the group containing one each of two different types of subframes: (i) a first type that contains an image captured by the cinematic camera for the entire subframe duration along with two different sets of tracking markers (e.g., color, shape, etc.), with a first of the tracking marker sets captured milliseconds after the start of the first type subframe and a second of the tracking marker sets captured milliseconds before the end of the first type subframe, and (ii) a second type that contains an image captured by the cinematic camera for the entire subframe duration and has no tracking marker sets. A difference between the second tracking marker sets of a tracking image preceding the immediately subsequent primary image along with the first tracking marker sets of a tracking image that immediately follows that primary image will represent movement of the cinematic camera during the primary image subframe. Of course, when some part of the sequence does not include any of the composite environment, the subframes in the groups making up that part of the sequence will inherently be second type subframes.

Figure 16:
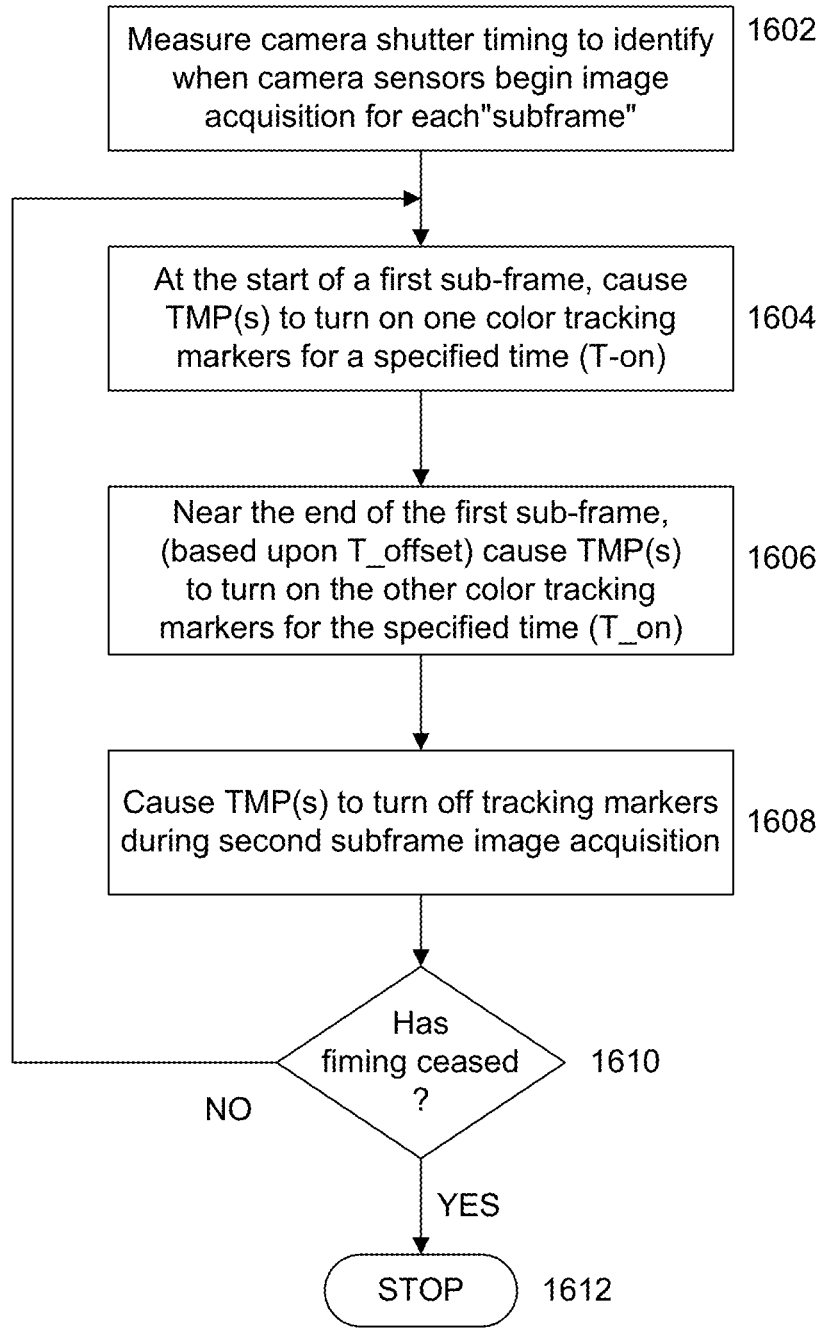
FIG. 16 illustrates, in simplified form, a flowchart for the operation of an MCU for the third type variants.

FIG. 16 illustrates, in simplified form, a flowchart for the operation of an MCU 104 for the third type variants. For ease of explanation, the flowchart refers to colors, but would be the same for any two different sets of tracking markers, where one set is analogous to one color and the other set is analogous to the other color. The process proceeds as follows:

Once (i) the camera 106 has been set for a frame rate that is double the ultimate intended frame rate and set for a 360 degree shutter angle, (ii) the TMP(s) are set for a suitably short tracking marker display duration (T_on), and (iii) the MCU is aware of the TMP(s) T_on setting, the process begins with the measurement of the timing for when the camera sensors begin image acquisition for each "subframe" (i.e., at the quadruple rate frame) (Step 1602). This can typically be done, before the start of filming, for example, during set up and determining placement of the tracking markers or, for example, during filming of the clapper board (sometimes alternatively called a synch slate or sound marker).

Once that timing measurement has been accomplished, at the start of a first subframe, the MCU signals the TMP(s) to turn on the tracking markers of a specified color, which will be the "stop" or "end of movement" indicating color (Step 1604). Based upon T_offset, near the end of the first sub frame, the MCU signals the TMP(s) to turn on the tracking markers of a different specified color, which will be the "go" or "start of movement" indicating color (Step 1606). The MCU will then signal the TMP(s) to turn off the tracking markers and delay for the duration of the next subframe (Step 1608).

If the MCU receives a signal indicating that filming has stopped, or loses a signal indicating the filming is continuing, depending upon the particular cinematic camera, (Step 1610), the process ends (Step 1612). However, if the filming continues (Step 1610), the process continues to cycle through Steps 1604 through Step 1608, until filming stops.

Thus, it should now be appreciated that these third type variants involve a type of combination of the P1 subframe 1304b and P2 subframe 1304c of FIG. 13 into a single subframe.

Configurations for Different Shutter Angles

Up to now, the second and third type variants have generally been described, by way of example, for simplicity, where the ultimate frame rate of the final shot will be 24 fps and a 180 degree shutter angle. However, as noted above, other shutter angles above and below 180 degrees can be used if desired. In general, for historical reasons relating to the use of a rotating shutter, available shutter angle settings tend to involve evenly divisible parts of 360 degrees.

Figure 17:
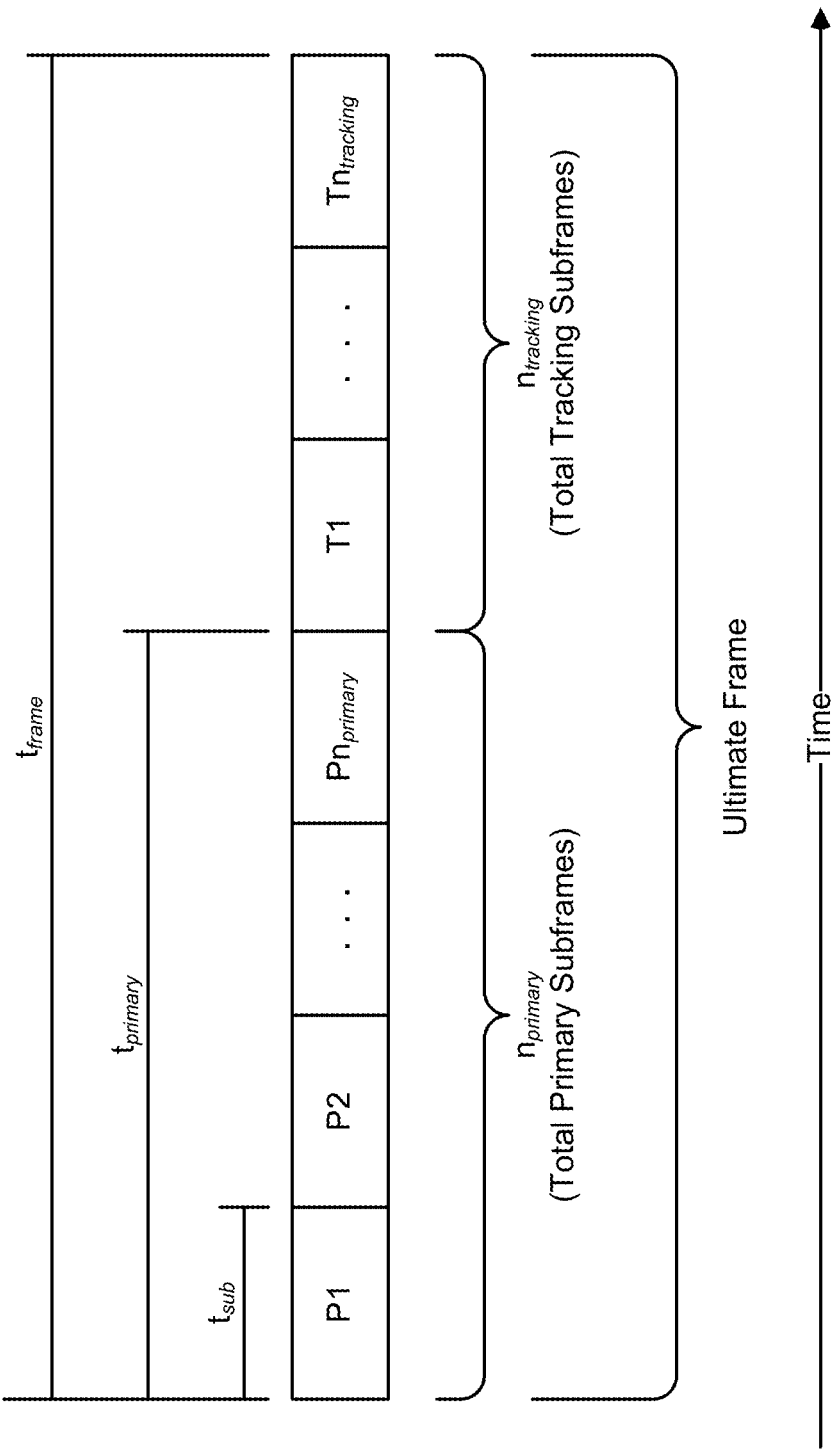
FIG. 17 illustrates, in simplified form, a representation of a set of subframes that illustrate aspects of the calculations that can be performed to use the second and third type variants for different shutter angles above and below 180 degrees.

FIG. 17 illustrates, in simplified form, a representation of a set of subframes that illustrate aspects of the calculations that can be performed to use the second and third type variants for different shutter angles above and below 180 degrees.

The following description provides the calculations that enable use of these variants with such other shutter angles wherein:

$fr_{ultimate}$ is the desired frame rate of the final film (e.g., 24 frames/second).

$t_{frame}$ is the time duration of the entire frame, calculated as: $t_{frame}=1/fr_{ultimate}$.

$\theta_{shutter}$ is the desired shutter angle.

$t_{primary}$ is the time duration of the overall primary frame portion.

Then, accordingly: $t_{primary}=t_{frame}*\theta_{shutter}/360$.

$t_{sub}$ is then selected as a timing value that is either the same as $t_{primary}$ or an integer factor of $t_{frame}$, depending upon the particular implementation. As such, the subframe frame rate is: $fr_{sub}=1/t_{sub}$ The cinematic camera is then set to film at a frame rate of $fr_{sub}$ with a shutter angle of 360 degrees. With this camera setting, n will be the number of subframes in $t_{frame}$: $n=t_{frame}/t_{sub}$.

To obtain a primary image frame for use in compositing, combine the $t_{ultimate}/t_{sub}$ consecutive primary subframes, for example, using intensity averaging, if the subframes were acquired with normal exposure, or, for example, by summation of their RGB values in linear color space, if the subframes were underexposed in proportion to the number of subframes where insufficient light was available during filming.

Based upon the foregoing, $n_{primary}$ is the number of subframes needed to compose a primary frame for that shutter angle, and $n_{tracking}$ is the number of remaining subframes available for use as tracking frames.

If the foregoing calculations indicate that the number of subframes ($n_{tracking}$)=1, if an implementation of the second type variant described above is to be used, an additional frame will be needed because two tracking frames are required per ultimate frame. Thus, $fr_{sub}$ can be doubled in order to obtain two tracking frames. However, if an implementation of the third type variant described above is to be used, only one tracking frame will be necessary, so $fr_{sub}$ can be used as is.

For purposes of example only, Table 2 below contains results of the foregoing calculations for more common shutter angles and an ultimate frame rate of 24 fps. However, it should be understood that the calculations do not change for other ultimate frame rates, whether standard or atypical. As can be seen in the last column of Table 1, the variant(s) that could be used according to these particular parameters are indicated by an "SV" for second-type variants and a "TV" for third type variants (due to the availability of only one tracking frame).

Note however that the use of different shutter angles can cause a need for additional storage, because each subframe will be stored as an image. As can be seen in Table 2 below, the examples described above for the second and third type variants, respectively, have an "n" of 4 and 2—yielding the respective need for a certain number of subframes and, consequently, quadruple or double the storage required with conventional filming. In contrast, to achieve a 30 degree shutter angle, twelve times the image storage could be required. Nevertheless, as has been repeatedly noted herein, the cost of even image storage is trivial relative to the cost of removing tracking markers, even if twelve or more times the storage is necessary. Thus, despite the additional storage requirements attendant with use of shutter angles that are greater or less than 180 degrees, most, if not all, of the advantages of those variants are retained.

TABLE 2

| $fr_{ultimate}$ | $\theta_{shutter}$ | $t_{frame}$ | $t_{primary}$ | $t_{sub}$ | n | $n_{primary}$ | $n_{tracking}$ | Variant |
|---|---|---|---|---|---|---|---|---|
| 24 | 30 | 1/24 | 1/288 | 1/288 | 12 | 1 | 11 | SV, TV |
| 24 | 45 | 1/24 | 1/192 | 1/192 | 8 | 1 | 7 | SV, TV |
| 24 | 60 | 1/24 | 1/144 | 1/144 | 6 | 1 | 5 | SV, TV |
| 24 | 90 | 1/24 | 1/96 | 1/96 | 4 | 1 | 3 | SV, TV |
| 24 | 120 | 1/24 | 1/72 | 1/72 | 3 | 1 | 2 | SV, TV |
| 24 | 180 | 1/24 | 1/48 | 1/48 | 2 | 1 | 1 | TV |
| 24 | 180 | 1/24 | 1/48 | 1/96 | 4 | 2 | 2 | SV, TV |
| 24 | 240 | 1/24 | 1/36 | 1/72 | 3 | 2 | 1 | TV |
| 24 | 240 | 1/24 | 1/36 | 1/144 | 6 | 4 | 2 | SV, TV |
| 24 | 270 | 1/24 | 1/32 | 1/96 | 4 | 3 | 1 | TV |
| 24 | 270 | 1/24 | 1/32 | 1/192 | 8 | 6 | 2 | SV, TV |

Advantageously, for cinematic cameras with advanced frame acquisition modes that allow the user to precisely control timing of when frames are acquired, either using settings of the camera itself or an interface that allows a shutter or sensor control signal to be supplied from an external source to trigger the sensors of the cinematic camera to acquire an image and the duration of the image acquisition.

As a result, filming using the above approaches for any arbitrary shutter angle can be achieved, because $t_{frame}$ need not be a multiple of $t_{sub}$. To do so, the cinematic camera would be set so that the timing for a single primary image subframe will set based upon the ultimate frame rate and shutter angle combination, and then, depending upon whether an implementation of the second type variant or third type variant is used, timing for one or two additional tracking frames are added. If only one tracking frame is needed, the tracking frame duration can be set to equal the timing for the single primary image subframe, and if two tracking subframes are needed, they can each be, for example, one half or less of the primary image subframe duration, individually equal to the primary image subframe duration, or of some other appropriate duration for the circumstances, because the primary image subframes and tracking subframes do not need to be the same length as each other, provided that: a) there is sufficient time allotted for a tracking frame to allow for the brightness of the projected tracking markers to stabilize, and b) all tracking subframes are of the same duration as each other.

Additional Sub-Variants Applicable to All Variant Types

Irrespective of which variant type above is implemented, certain sub-variants of those types can be configured with additional aspects that may provide additional independent advantages.

By way of example, some such sub-variants relate to how the MCU 104 and multiple TMPs 102 can be connected.

Figure 18A:
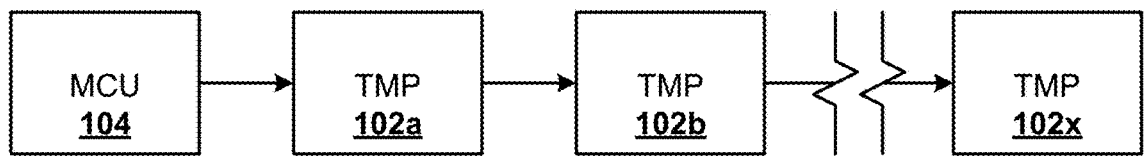
FIG. 18A illustrates, in simplified form, a "daisy chain" connection arrangement.

FIG. 18A illustrates, in simplified form, a "daisy chain" connection arrangement 1800a, where an MCU 104 is connected to one TMP 102a, via a wired or wireless connection, and that TMP 102b, is connected to another TMP 102 (not shown), which, in turn, is connected to another TMP 102x, and so on. However, this configuration may be unsuitable for certain applications because a drawback of this daisy chain connection arrangement is that latency down the chain could be an issue, and may need to be compensated for, which can be done using any of several different known approaches and is irrelevant to understanding the teachings herein.

Figure 18B:
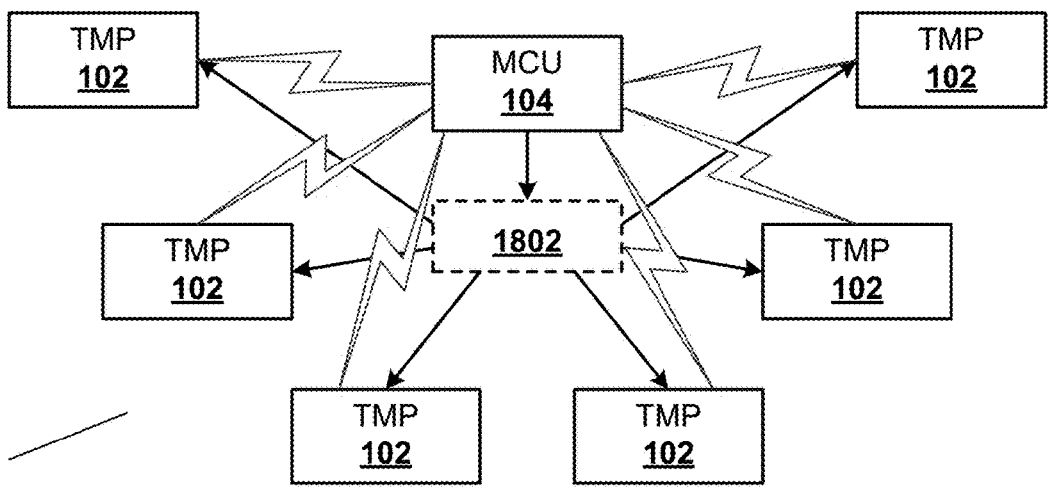
FIG. 18B illustrates, in simplified form, an arrangement where the MCU is connected to TMPs in what is known as a star, "hub and spoke" or broadcast arrangement.

FIG. 18B illustrates, in simplified form, an arrangement where the MCU is connected to TMPs in what is known as a star, "hub and spoke" or broadcast arrangement 1800b. With this arrangement, the MCU 104 is connected to each TMP 102, either directly, if the MCU includes multiple parallel outputs, or indirectly via a switch or splitter 1802 that enables each TMP 102 to receive their input at essentially the same time (i.e., deviations in receipt time that are small enough that they don't affect output timing are considered to be received at the same time). Alternatively, for wireless communication, the MCU 104 will broadcast its signals for receipt by all of the TMPs 102.

Figure 18C:
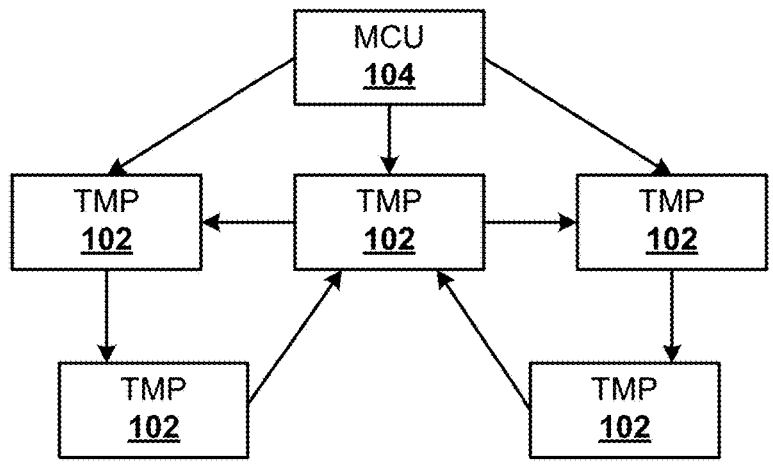
FIG. 18C illustrates, in simplified form, an arrangement where the MCU can be connected to the TMPs in a form of mesh configuration.

FIG. 18C illustrates, in simplified form, an arrangement where the MCU can be connected to the TMPs 102 in a form of mesh configuration 1800c where each TMP 102 receives its information either directly from the MCU 104 (as in FIG. 18B) but also can receive that information via at least one other TMP 102.

Other sub-variants relate to the light sources of a TMP 102. For example, where different color light sources are necessary or desirable, for example, to make an implementation according to our third type variants, some individual TMP 102 implementations can include two or more different color light sources that are arranged so that some or each can exit from the same output 202. In this manner, switching among the colors will not result in a deviation of the tracking marker location on the backdrop, even if the tracking marker placement involves use of the ball and socket swivel joints 204.

Alternatively, a TMP 102 may only have a single color light source, in which case, if use of two different color markers is desired, at least a second TMP 102 with a different color light source will be required. This configuration may be desirable for some cases, because it allows the two different color light source-containing TMPs 102 to be placed in different locations, while still allowing the tracking markers to be aimed at the same location so that, when a switch is made from one TMP to another, the tracking marker at the commonly aimed position will merely appear to change color.

Figure 19A:
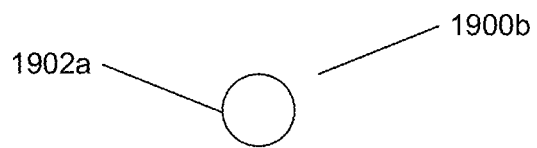
FIG. 19A illustrates, in simplified form, the mode pattern of a single mode laser, FIGS. 19B and 19C respectively illustrate, in simplified form, example multimode laser lobe patterns.
Figure 19B:
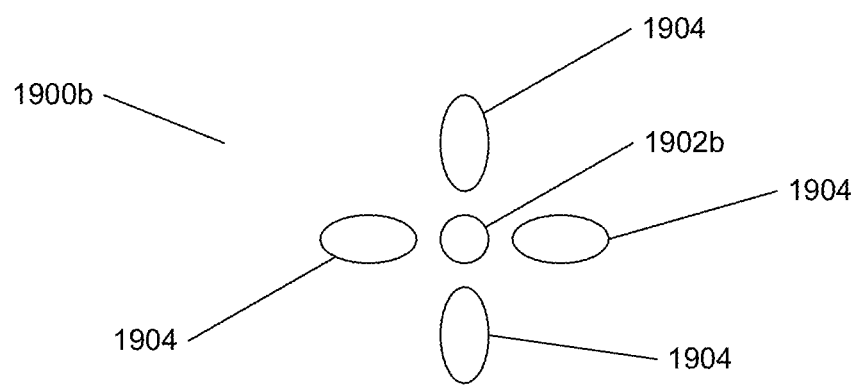
FIG. 19D-19F illustrate, in simplified form, examples of pairs of slightly different shapes that can be used as tracking markers.
Figure 19C:
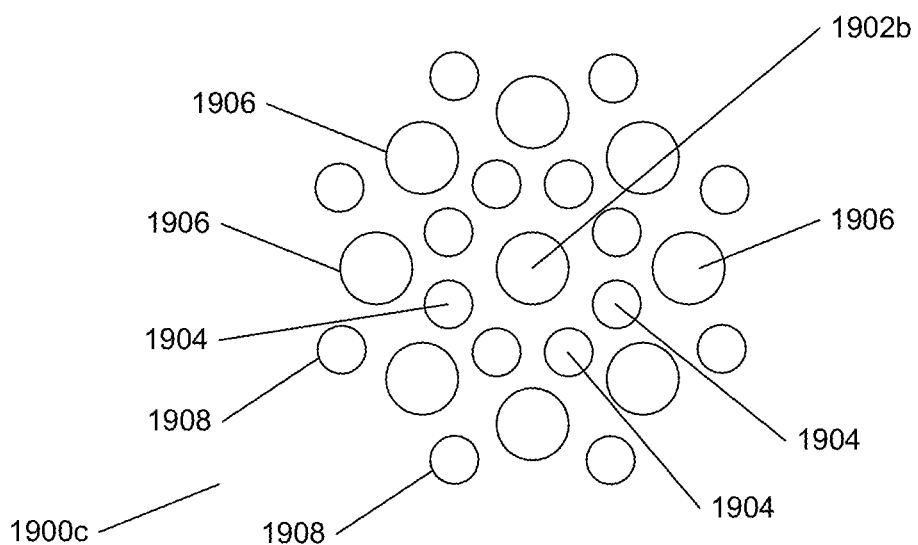

Sub-variants that use lasers can make use of the fact that lasers and laser diodes, are available as single mode and multimode devices. FIG. 19A illustrates, in simplified form, the mode pattern 1900a of a single mode laser. With a single mode laser, the far field mode pattern is a clear, well defined, single lobe or dot 1902a. FIGS. 19B and 19C respectively illustrate, in simplified form, example multimode laser lobe patterns 1900b, 1900c. More particularly, FIG. 19B illustrates, in simplified form, a pattern 1900b of a two mode laser, showing the primary mode 1902b and the secondary mode lobes 1904, and FIG. 19C illustrates, in simplified form, a pattern 1900c of a more highly multimode laser showing, for example, the mode lobes of the primary mode 1902b, second order mode lobes 1904, third order mode lobes 1906 and fourth order mode lobes 1908, Advantageously, use of a single mode laser for the tracking marker light source can yield a very clear dot on a backdrop. In contrast, as can be seen from FIG. 19B-19C, the mode lobes of a multimode laser can advantageously be used, with proper lensing and/or diffraction/polarizing elements, to provide tracking marker(s) directly made up of the mode lobe patterns, if desired.

Figure 19D:
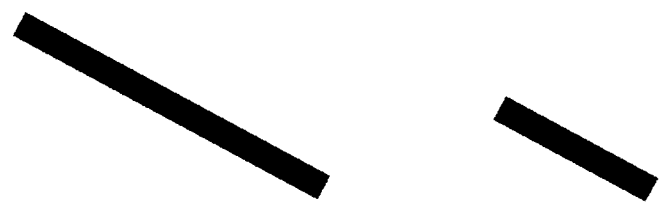
Figure 19E:
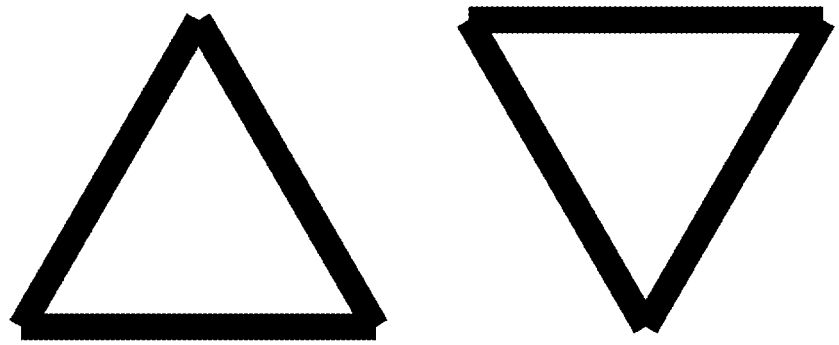
Figure 19F:

FIG. 19D-19F illustrate, in simplified form, examples of pairs slightly different tracking marker shapes that can be used as tracking markers as described above, with the caveat that any shapes can be used provided they meet the requirements described above regarding being able to distinguish one from the other if they are the same color and they have a known, identifiable point of overlap, for example, a common end point, corner or intersection point.

Additionally, or alternatively, for purposes of tracking marker shapes a TMP can incorporate one or more a light pattern generating laser(s), for example, as commercially available from, for example, Coherent, Inc., 5100 Patrick Henry Drive, Santa Clara, Calif. 95054.

Post-Production Using the Films

Once a shot has been captured, post-production is performed on the captured film in order to create a final film from the raw film shot by the cinematic camera.

Figure 20:
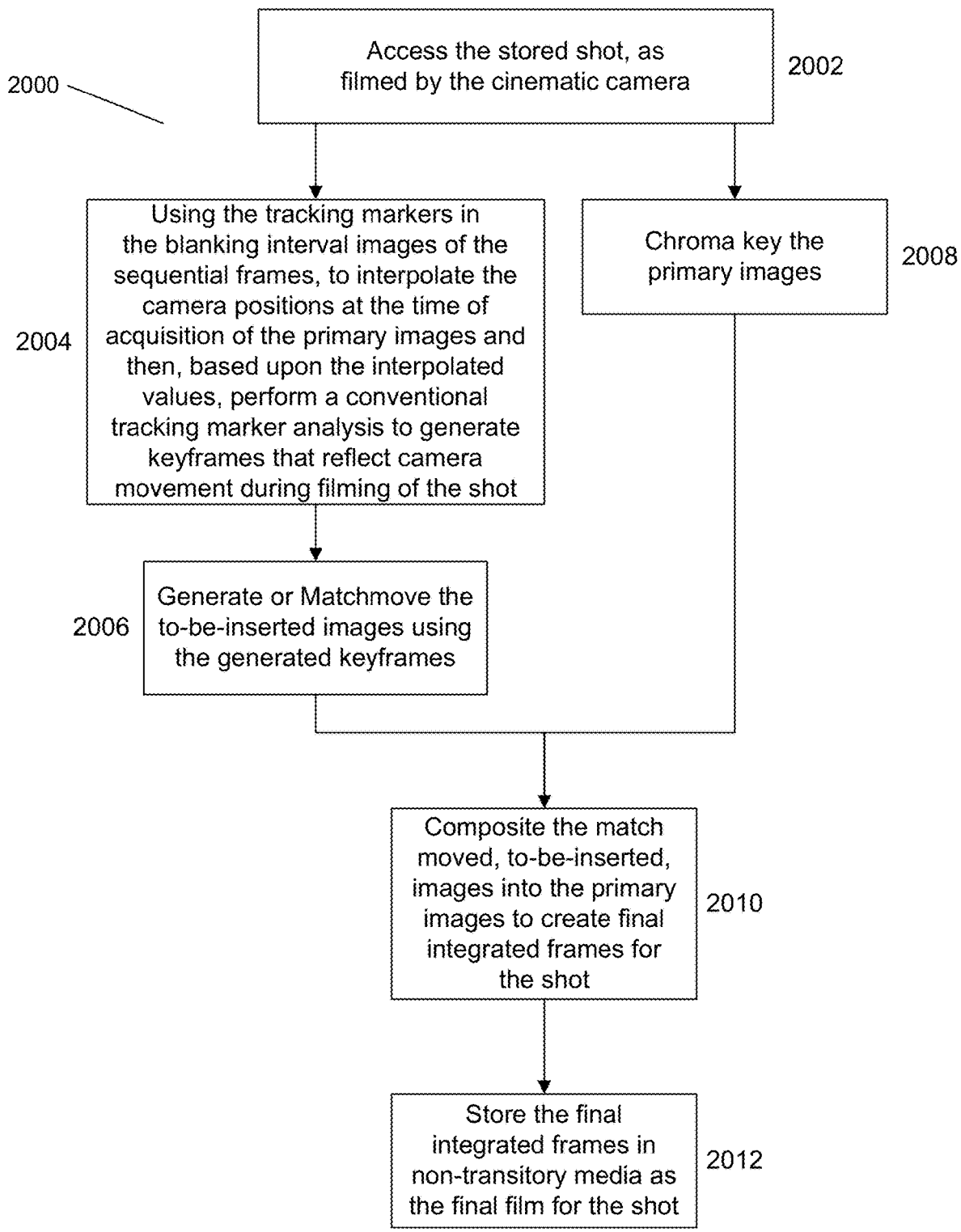
FIG. 20 illustrates, in simplified form, a flowchart of the process of creating a final visual effects shot from the subframe sequence filmed by a cinematic camera according to the first type variant approaches.

FIG. 20 illustrates, in simplified form, a flowchart 2000 of the process of creating a final visual effects shot from the subframe sequence filmed by a cinematic camera according to the first type variant approaches.

First, the stored shot, acquired by the cinematic camera, is accessed (Step 2002)

The process then proceeds in two paths, either of which can be performed before the other, or they can be performed in parallel (in whole or part), as follows:

With respect to the images from the blanking intervals containing tracking markers, the tracking markers present in the sequential images acquired by the cinematic camera during the blanking intervals, a conventional tracking marker analysis is performed, as if those images were shot using a conventional approach that required tracking marker removal, to generate keyframes that reflect camera movement during the shot (Step 2004). This is done by using the blanking interval pairs that contain the tracking markers, and bookend the respective primary images, to interpolate the camera's position(s) at the time of primary image acquisitions and, using those interpolated values to generate keyframes. The resulting generated keyframes are then placed at their appropriate temporal positions within the sequence, i.e., before and after the respective primary images in accordance with the original tracking marker projection times and the tracking values are interpolated for the center of the primary images. There are multiple different software packages available for performing such operations using tracking markers. By way of non-limiting example, one such software package is Nuke, which is commercially available from The Foundry Visionmongers Ltd, 5 Golden Square, London, W1F 9HT, United Kingdom.

The generated keyframes are also either used to generate the required to-be inserted images by controlling an actual camera's movement in order to acquire the to-be-inserted images or, in the case where the to-be-inserted images are computer generated, to move a virtual camera within a computer generated location (Step 2006).

Turning to the primary images, the primary images are chroma keyed in a conventional manner to remove the backdrop present in any frames without the need to remove any tracking markers (Step 2008).

Then, the match moved, to-be-inserted, images are conventionally composited into the primary images to create final integrated frames (Step 2010).

Finally, the final integrated frames are stored in non-transitory media, for example, into non-transitory electronic storage or onto physical film (Step 2012).

Figure 21:
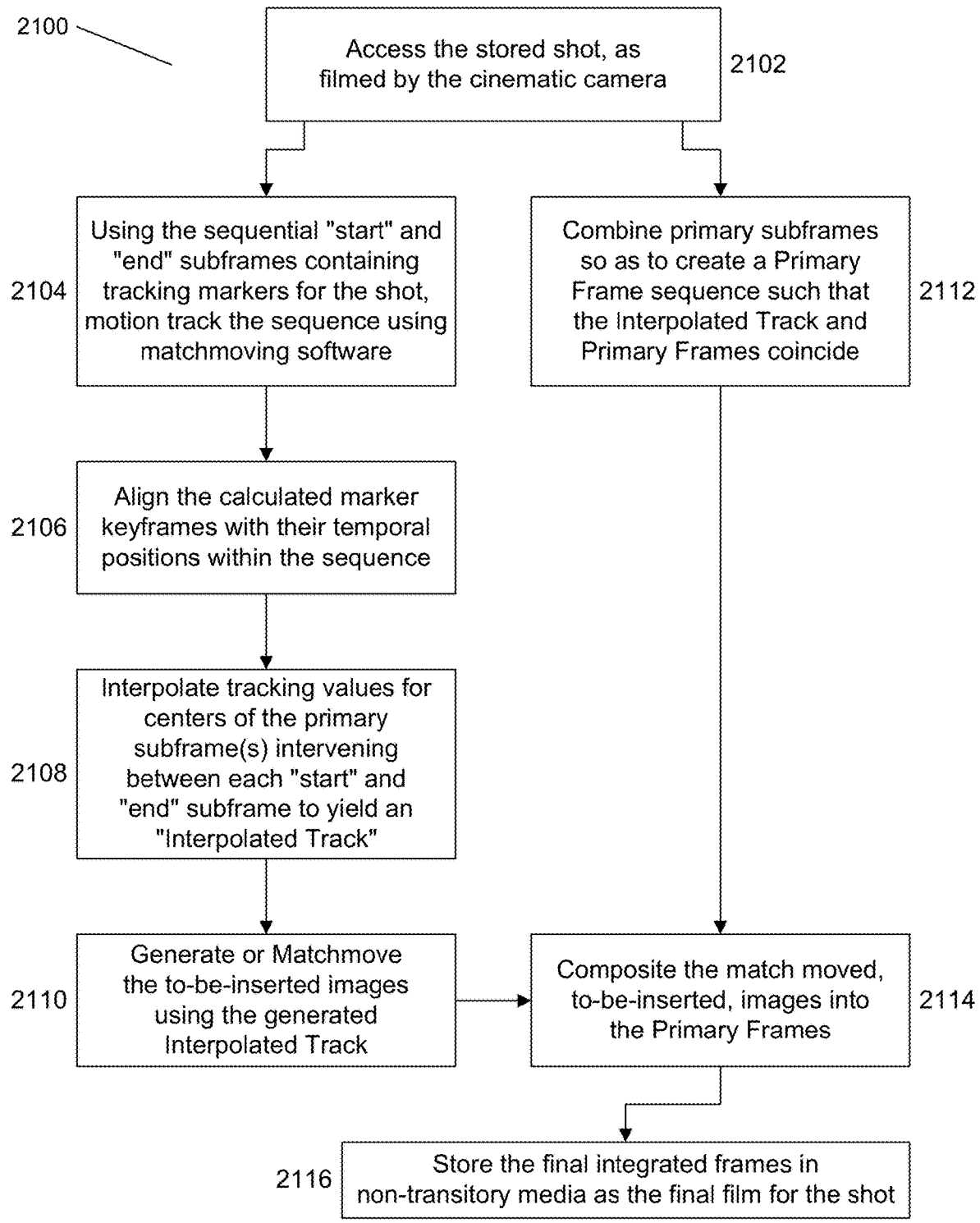
FIG. 21 illustrates, in simplified form, a flowchart 2100 of the process of creating a final visual effects shot from the subframe sequence filmed by a cinematic camera according to the second type variant approaches.

FIG. 21 illustrates, in simplified form, a flowchart 2100 of the process of creating a final visual effects shot from the subframe sequence filmed by a cinematic camera according to the second type variant approaches.

As with the process of FIG. 20, it is to be recognized that some or all of the steps involved in processing the subframes containing tracking markers can occur before, during, or after, some or all of the steps involved in processing the primary image subframes.

The process begins by accessing a stored shot, acquired by the cinematic camera using a second type variant approach (Step 2102).

As to the subframes that contain tracking markers, the sequential subframes of the first type and final type (i.e., "start" and "end" tracking marker-containing frames) are used to generate keyframes (Step 2104).

The resulting calculated marker keyframes are then placed at their appropriate temporal positions within the sequence, i.e., before and after the intervening primary subframes (Step 2106) in accordance with the original tracking marker projection times.

Then, depending upon the number of primary subframes between each pair of first type and final type subframes and the number of primary subframe(s) to be used relative to the intended final shutter angle, the tracking values are interpolated for the center of the appropriate primary frame(s) (Step 2108). For example, if only one primary subframe is to be used, the tracking value for the center time for that primary subframe is interpolated. Alternatively, if there are only two primary subframes in between a first type and final type subframe, and both will be combined (as described above using, for example, intensity averaging or RGB value summation) to create a "Primary Frame" that will be composited, the tracking values are interpolated for the time between the two primary subframes in between. If more than two primary subframes are between a first type and final type subframe and more than two will be combined, or some will be discarded/ignored, the tracking values will be interpolated for the center time of the final combined image that is to be used as the ultimate primary subframe. The resulting collective interpolated tracking values (called herein an "Interpolated Track") corresponds to the camera movement during filming of the ultimate primary subframes.

Then the Interpolated Track is used either to generate the required to-be-inserted images by controlling an actual camera's movement in order to acquire the to-be-inserted images or, in the case where the to-be-inserted images are computer generated, to move a virtual camera within a computer generated location (Step 2110).

Before, after, or in parallel, in whole or part, the stored primary subframes are accessed and, where two or more are to be combined, they are combined (so as, in either case, to yield a Primary Frame sequence) such that the timing of the Interpolated Track and Primary Frame sequence coincide (Step 2112).

The Interpolated Track, Primary Frame sequence, and to-be-inserted images are used to composite the to-be-inserted images into the Primary Frame sequence (Step 2114), using the conventional compositing process, as if the Primary Frame sequence was a conventional stream of frames that had originally contained tracking markers, which were removed, to create the final composited visual effects shot.

Finally, the final composited visual effects shot is stored in non-transitory media, for example, into non-transitory electronic storage or onto physical film (Step 2116).

Figure 22:
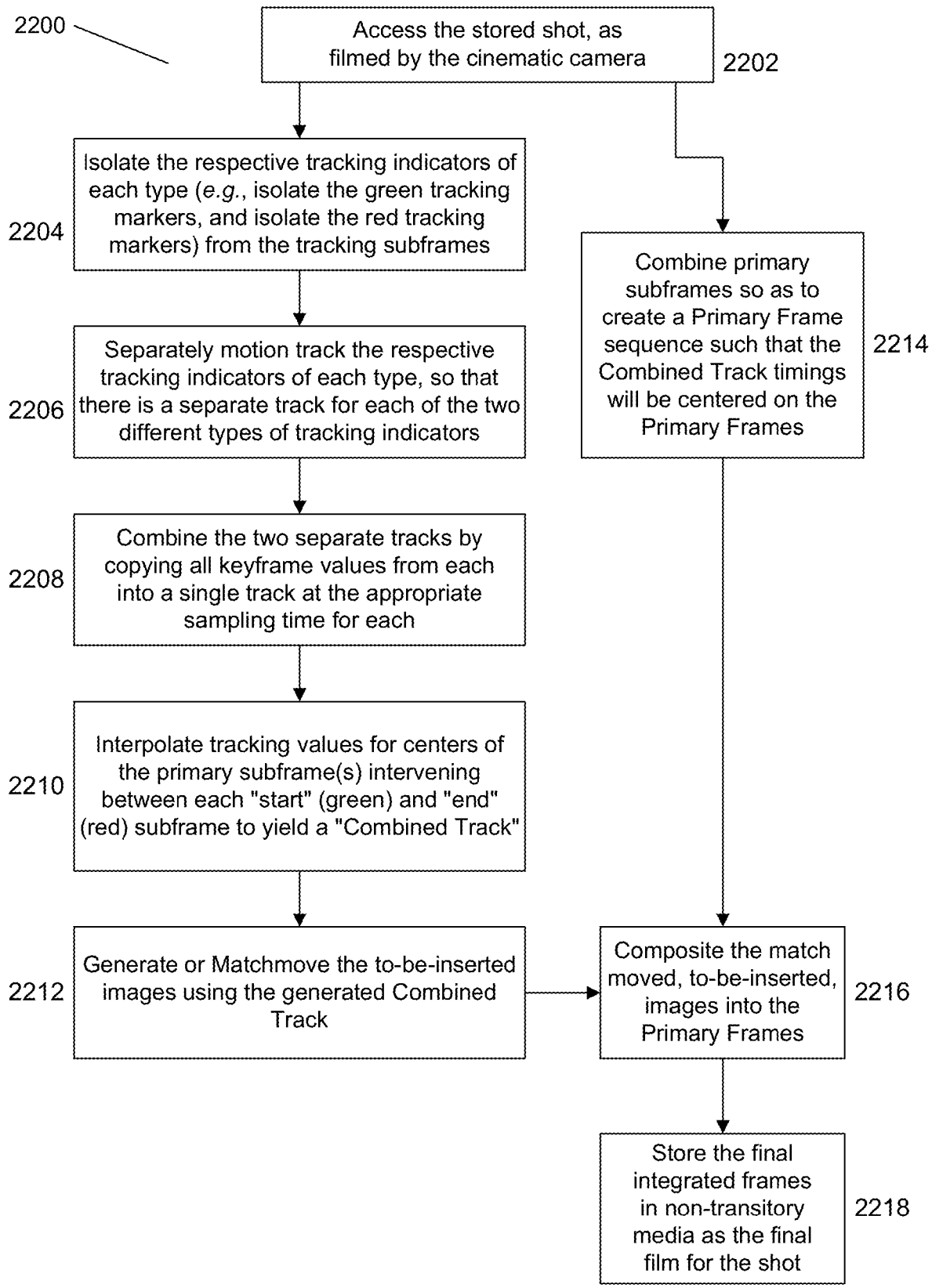
FIG. 22 illustrates, in simplified form, a flowchart 2200 of the process of creating a final visual effects shot from the subframe sequence filmed by a cinematic camera according to the third type variant approaches.

FIG. 22 illustrates, in simplified form, a flowchart 2200 of the process of creating a final visual effects shot from the subframe sequence filmed by a cinematic camera according to the third type variant approaches, with, for simplicity, use of colored tracking indicators, for example, "green" tracking markers to indicate the start of a set of primary subframes, and "red" tracking markers to indicate the end of a set of primary frames. Again, the processing of the tracking subframes and primary subframes can occur, in whole or part, in parallel or concurrently.

As with the post processing for the previous variants, the process begins by accessing a stored shot, acquired by the cinematic camera using a third type variant approach (Step 2202).

With respect to the tracking subframes, the tracking indicators of each type are separately isolated (i.e., in this example, the green tracking markers are all isolated, and the red tracking markers are all separately isolated) (Step 2204).

Next, the respective tracking markers are separately motion tracked so that, when complete, there is, in actuality or effect, a separate green track and a separate red track (Step 2206).

Then, the two separate tracks are combined by copying their keyframe values into a single track based upon their individual sampling times (Step 2208). Using the single combined track, tracking values for the centers of the intervening (i.e., between each start-stop pair) primary subframes are interpolated so as to correspond to the Primary Frames (as they will exist following any combining or discarding) to yield a Combined Track (Step 2210).

Next, the Combined Track is used to generate or matchmove the to-be-inserted images (Step 2212).

On the primary subframes side, the primary subframes are combined/discarded as necessary to yield Primary Frames that correspond to the proper shutter angles for the final film (Step 2214).

Then the match moved, to-be-inserted images are composited into the Primary Frames (Step 2216) using a conventional compositing process and the final composited footage is stored in non-transitory media, for example, into non-transitory electronic storage or onto physical film (Step 2218).

Having described the various components, their operation, different representative ways for using them, and results of the usage, for purposes of further understanding, some specific examples will now be provided.

Specific Further Examples of the Different Type Variants Described Above

Example 1—a Method of Filming Involving a Composite Environment

This method involves:
communicatively coupling a cinematic camera to a master control unit (MCU) that is communicatively coupled to a tracking marker projector (TMP), so that
- a) when the cinematic camera is filming a shot at a specified frame rate and shutter angle, the shot is made up of frames wherein each frame includes an image portion and a blanking interval;
- b) while the filming of the shot is occurring, and based upon the specified frame rate, a primary image will be acquired during a normal imaging interval for each frame, and
  - i) during each blanking interval of each frame
    - A) the tracking marker projector (TMP) will be caused to project tracking markers onto a backdrop within the composite environment, during the blanking interval, for a duration that is less than a duration of the blanking interval,
    - B) sensors of the cinematic camera will acquire an image during the blanking interval, that includes the projected tracking markers; and
  - ii) the frames of the shot will be stored in non-transitory storage;

wherein tracking markers captured within a first blanking interval immediately preceding a primary image of a frame, and tracking markers of the blanking interval of the frame, will jointly represent motion of the cinematic camera during filming of the primary image of the frame therebetween.

Example 1a

A sub-variant of the Example 1 method involves the projected tracking markers comprising light emitted by a laser.

Example 1b

Another sub-variant of the Example 1 method involves the blanking interval being equal to the normal imaging interval.

Example 1c

Another sub-variant of the Example 1 method involves the primary image being acquired for a shutter angle that is less than 180 degrees.

Example 1d

Another sub-variant of the Example 1c method involves the tracking markers being projected at a time equal to a blanking interval start time plus a timing offset.

Example 1e

Another sub-variant of the Example 1c method involves the tracking markers being projected for a duration equal to the blanking interval minus the timing offset.

Example 1f

Another sub-variant of the Example 1 method involves the tracking markers being projected for a duration equal to the blanking interval minus a timing offset.

Example 1g

Another sub-variant of the Example 1 method involves the blanking interval beginning at an end of a normal imaging interval, the normal imaging interval being based upon the shutter angle, and the tracking markers being projected at a time equal to a blanking interval start time plus a timing offset.

Example 1h

A sub-variant of the Example 1g method involves the tracking markers being projected for a duration of less than 15 mS.

Example 1i

A sub-variant of the Example 1h method involves the tracking markers being projected for a duration of less than 3 mS.

Example 1j

Another sub-variant of the Example 1 method involves the specified frame rate being one of 23.976 fps, 24 fps, 25 fps, 29.97 fps, 48 fps, 50 fps, 59.94 fps, or 60 fps.

Example 2—a Method of Filming Involving a Composite Environment

The method involves:
a) receiving a signal from a cinematic camera, set to film at a specified frame rate and shutter angle, the signal indicating a start of primary image acquisition for a frame,
  i) based upon the shutter angle setting and a specified offset delay, within a blanking interval of the frame, causing:
    A) a tracking marker projector (TMP) to project tracking markers onto a backdrop within the composite environment for a specified duration, and
    B) sensors of the cinematic camera to capture an image containing the projected tracking markers,
b) continuing to perform "i)" until an indication that the cinematic camera has stopped filming is received; and
c) receiving an indication that the cinematic camera has stopped filming;
wherein, following "c)" a compositable shot made up of the filmed frames will be stored in non-transitory storage in a form such that the image containing the projected tracking markers captured during the blanking intervals establish the cinematic camera's movement during the acquisition of the primary images and can be used to composite alternative images into the primary images of the frames in place of captured backdrop within the primary images of the frames.

Example 2a

A sub-variant of the Example 2 method involves the projected tracking markers being made up of laser light.

Example 2b

Another sub-variant of the Example 2 method involves the blanking interval being equal to the normal imaging interval.

Example 2c

Another sub-variant of the Example 2 method involves the primary image being acquired for a shutter angle that is less than 180 degrees.

Example 2d

A sub-variant of the Example 2c method involves the tracking markers being projected at a time equal to a blanking interval start time plus a timing offset.

Example 2e

Another sub-variant of the Example 2c method involves the tracking markers being projected for a duration equal to the blanking interval minus the timing offset.

Example 2f

Another sub-variant of the Example 2 method involves the tracking markers being projected for a duration equal to the blanking interval minus a timing offset.

Example 2g

Another sub-variant of the Example 2 method involves the blanking interval beginning at an end of a normal imaging interval, the normal imaging interval being based upon the shutter angle, and the tracking markers being projected at a time equal to a blanking interval start time plus a timing offset.

Example 2h

A sub-variant of the Example 2g method involves the tracking markers being projected for a duration of less than 15 mS.

Example 2i

A sub-variant of the Example 2h method involves the tracking markers being projected for a duration of less than 3 mS.

Example 2j

Another sub-variant of the Example 2 method involves the specified frame rate being one of 23.976 fps, 24 fps, 25 fps, 29.97 fps, 48 fps, 50 fps, 59.94 fps, or 60 fps.

Example 3—a Non-Transitory Film Product

The film product involves a shot including a sequence of multiple image-containing frames stored within non-transitory storage, captured by sensors of a cinematic camera, each of the frames having an image portion and a blanking interval, wherein at least some of the image portions of some of the frames contain a primary image including a portion of a backdrop filmed by the cinematic camera and, for the frames containing the portion of the backdrop, each such frame will also include a tracking image captured within the frame's blanking interval, the tracking image containing projected tracking markers located within the portion of the backdrop;
  wherein
  a) first projected tracking markers of a first tracking image within a blanking interval of a frame immediately preceding the primary image-containing frame, and
  b) second projected tracking markers of a first tracking image within the blanking interval of the frame containing the primary image,
  jointly represent the cinematic camera's motion during filming of the primary image.

Example 3a

A sub-variant of the Example 3 non-transitory film product involves the image portion and blanking interval being equal in duration.

Example 3b

Another sub-variant of the Example 3 non-transitory film product involves the image portion and blanking interval being of different durations.

Example 3c

Another sub-variant of the Example 3 non-transitory film product involves the image portion is stored on physical film.

Example 3d

A sub-variant of the Example 3c non-transitory film product involves the tracking image being stored on physical film.

Example 3e

Another sub-variant of the Example 3c non-transitory film product involves the tracking image being stored in non-transitory storage.

Example 4—a Method of Creating a Film Product

The method involves:
  accessing a shot, stored within non-transitory storage, comprising a sequence of frames filmed using a cinematic camera in a composite environment, wherein each of the frames includes a primary image acquired by the cinematic camera and a blanking interval, wherein at least one primary image within the sequence includes backdrop;
  using a computerized film post processing system, processing the shot by
  a) identifying, for a first frame, tracking markers present within first backdrop contained within an image acquired by the cinematic camera within the blanking interval of the first frame,
  b) identifying, for a second frame immediately preceding the first frame, tracking markers present within second backdrop contained within an image acquired by the cinematic camera within the blanking interval of the second frame,
  c) using the first identified tracking markers and the second identified tracking markers to calculate a movement vector for the cinematic camera during acquisition of a primary image in the first frame,
  d) accessing replacement image footage stored within non-transitory storage;
  e) based upon the movement vector, matchmoving at least a part of the replacement image footage to the primary image so as to create matchmoved replacement image footage,
  f) compositing some of the matchmoved replacement image footage into the primary image in place of backdrop present in the primary image using compositing software so as to transform the primary image into a final frame,
  g) storing the final frame in non-transitory storage, and
  h) repeating "a)"-"f)" for all frames in the sequence having primary images containing any backdrop;
  wherein, following completion of the processing of the shot, the final frames corresponding to the sequence will be a final version of the shot.

Example 4a

A sub-variant of the Example 4 involves each "g)" occurs immediately following completion of a single instance of "f)".

Example 4b

Another sub-variant of the Example 4 involves "g)" for a particular final frame occurring at some time between a start of "a)" and an end of "f)" for a subsequent final frame that follows the particular final frame.

Example 5—a Method of Filming Involving a Composite Environment

The method involves:

communicatively coupling a cinematic camera to a master control unit (MCU), the MCU being communicatively coupled to a tracking marker projector (TMP);

setting the cinematic camera to film subframes at a frame rate that is at least four times an intended final frame rate for a shot;

causing the camera to acquire images in the subframes, at the frame rate, wherein at least some of the images will include parts of a backdrop of the composite environment;

while the camera is acquiring the images, and based upon the frame rate of the cinematic camera, based upon a timing calculated by the MCU, the MCU will cause the TMP to operate such that a) during filming of a first type subframe of a group of subframes, the TMP will project tracking markers onto the backdrop for a duration of less than 15 mS, at a time immediately prior to an end of the first type subframe;
 b) during filming of one or more second type subframes of the group, the TMP will not project the tracking markers;
 c) during filming of a final type subframe of the group, at a start of the final type subframe of the group, the TMP will project the tracking markers onto the backdrop for the duration; and wherein "a)"-"c)" repeat, in sequence for subsequent groups, at least until filming of the shot stops; and wherein, the tracking markers acquired by the cinematic camera during filming of each first type subframe and the tracking markers acquired by the cinematic camera during filming of each final type subframe jointly represent the cinematic camera's motion during filming of the images acquired during filming of the one or more second type subframes therebetween.

Example 5a

A sub-variant of the Example 5 involves the projected tracking markers comprising light emitted by a laser.

Example 5b

Another sub-variant of the Example 5 involves the frame rate being one of: 95.904 fps, 96 fps, 100 fps, 119.88 fps, 192 fps, 200 fps, 239.76 fps, or 240 fps.

Example 5c

Another sub-variant of the Example 5 involves setting the cinematic camera to film at a shutter angle of 360 degrees.

Example 5d

Another sub-variant of the Example 5 involves the duration being less than 12 mS.

Example 5e

Another sub-variant of the Example 5 involves the duration being less than 3 mS.

Example 6—a Method of Filming Involving a Composite Environment

The method involves:

receiving a signal, indicating a start of image acquisitions, from a cinematic camera, wherein the cinematic camera is set to film subframes at a specified subframe filming rate that is at least four times an intended final frame rate;

based upon the specified subframe filming rate, signaling a tracking marker projector (TMP) to operate such that, in groups of at least four subframes of three different types a) during filming by the cinematic camera of an image during a first type subframe of a group, the TMP will project tracking markers, onto a backdrop of the composite environment, for a duration of less than 15 mS, at a time immediately prior to an end of the first type subframe, for acquisition by the cinematic camera within the first image if the first image includes at least a portion of the backdrop,
 b) during filming by the cinematic camera of an image during a second type subframe of the group, that either immediately follows the first type subframe of the group or another second type subframe of the group, the TMP will not project tracking markers;
 c) during filming by the cinematic camera of an image during a final type subframe, immediately following a preceding second type subframe, the TMP will project tracking markers at a start of the final type subframe for the duration; and repeating "a)"-"c)", in sequence for subsequent groups, at least until filming of the shot stops; and wherein, tracking markers within a specific group, located within the first type subframe of the specific group and tracking markers within the final type subframe of the specific group jointly represent motion of the cinematic camera during filming of all second type subframes therebetween.

Example 6a

A sub-variant of the Example 6 involves the projected tracking markers comprising light emitted by a laser.

Example 6b

Another sub-variant of the Example 6 involves the frame rate being one of: 95.904 fps, 96 fps, 100 fps, 119.88 fps, 192 fps, 200 fps, 239.76 fps, or 240 fps.

Example 6c

Another sub-variant of the Example 6 involves setting the cinematic camera to film at a shutter angle of 360 degrees.

Example 6d

Another sub-variant of the Example 6 involves the duration being less than 12 mS.

Example 6e

Another sub-variant of the Example 6 involves the duration being less than 3 mS.

Example 7—a Method Involving Filming in a Composite Environment

The method involves:

receiving a signal from a master control unit (MCU), indicating a timing for image acquisitions by a cinematic camera, wherein the cinematic camera is set to film subframes at a specified subframe filming rate that is at least four times an intended final frame rate;

based upon the received timing, in groups of at least four subframes timed to the image acquisitions a) during filming by the cinematic camera of an image during a first type subframe of a group, projecting tracking markers, onto a backdrop of the composite environment, for a duration of less than 15 mS, at a time immediately prior to an end of the first type subframe, for acquisition by the cinematic camera within the image if the image includes at least a portion of the backdrop, b) during filming by the cinematic camera of an image during a second type subframe of the group, immediately following either a preceding first type subframe of the group or second type subframe of the group, not projecting tracking markers;

c) during filming by the cinematic camera of a image during a final type subframe of the group, projecting tracking markers immediately following a preceding second type subframe, at a start of the final type subframe, for the duration; and repeating "a)"-"c)", in sequence for each subsequent group, until at least a signal is received from the MCU indicating that projecting of tracking markers should stop.

Example 7a

A sub-variant of Example 7 involves the projected tracking markers comprising light emitted by a laser.

Example 7b

Another sub-variant of the Example 7 involves the duration being less than 12 mS.

Example 7c

Another sub-variant of the Example 7 involves the duration being less than 3 mS.

Example 8—a Non-Transitory Film Product

The film product involves:

a shot including a sequence of groups of image-containing subframes stored within non-transitory storage, all of the subframes being of a duration in common with each other, the contained images having been acquired by sensors of a cinematic camera filming at a frame rate that is at least quadruple an intended final frame rate for the shot, wherein, when a group includes at least a portion of a backdrop from a composite environment, each subframe in the group will be one of three different types of subframes a) a first type subframe that contains an image captured by the sensors of the cinematic camera for the duration of the entire first type subframe, along with first tracking markers acquired within the image for a short duration at a first time immediately prior to an end of the first type subframe, b) a second type subframe that contains an image acquired by the sensors of the cinematic camera for the duration of the entire second type subframe and has no tracking markers within the image, and c) a third type subframe that contains an image captured by the sensors of the cinematic camera for the duration of the entire third type subframe, along with second tracking markers acquired within the image, for the short duration at a second time immediately after start of the third type subframe;

wherein the subframes of the group consist of one first type subframe, followed by at least two second type subframes, followed by one third type subframe; and wherein the first tracking markers and second tracking markers within the group jointly represent motion of the cinematic camera during filming of the images acquired during the at least two second type subframes.

Example 8a

A sub-variant of Example 8 involves the non-transitory storage for the image portion being physical film.

Example 8b

A sub-variant of Example 8a involves the non-transitory storage for the tracking image being physical film.

Example 8c

Another sub-variant of Example 8 involves the non-transitory storage being electronic storage.

Example 9—a Method of Creating a Film Product

The method involves:

I) accessing a shot, stored within non-transitory storage, comprising a sequence of subframes filmed using a cinematic camera in a composite environment, the subframes having been acquired by the cinematic such that, at least some of the subframes include backdrop, wherein the sequence comprises groups of at least four subframes of three different types a) a first type subframe that contains an image acquired by the cinematic camera, along with first tracking markers present on a backdrop within the image, wherein the first tracking markers were projected for a short duration at a first time, immediately prior to an end of acquisition of the first type subframe, b) a second type subframe that contains an image acquired by the sensors of the cinematic camera and has no tracking markers within the image, and c) a third type subframe that contains an image captured by the cinematic camera along with second tracking markers present on a backdrop within the image, wherein the second tracking markers were projected for the short duration at a second time, immediately after start of the third type subframe, and wherein each group consists of, in sequence, one first type subframe, followed by at least two second type subframes, followed by one third type subframe;

II) using a computerized film post processing system, processing each of the groups of the shot by a) identifying the first tracking markers within the first type subframe and the third type subframe, b) using the identified first tracking markers and the identified second tracking markers, calculating a movement vector for the cinematic camera during acquisition of the second type subframes of the group,
c) based upon the movement vector, matchmoving at least a portion of replacement image footage to the second type subframes,
d) compositing the portion of the match moved replacement image footage in place of backdrop present in a composite-ready subframe obtained from the at least two second type subframes of the group,
e) storing a result of the compositing in the non-transitory storage as a final frame, and
f) repeating "II)a)"-"The)" for all groups having any backdrop therein;
III) wherein, following completion of "II)", the final frames will be a sequence of a final version of the shot.

Example 9a

A sub-variant of Example 9 involves using only one of the second type subframes as the composite-ready subframe.

Example 9b

Another sub-variant of Example 9 involves combining two of the second type subframes to form one composite-ready subframe.

Example 9c

A sub-variant of Example 9b involves, for an individual group, combining the two second type subframes to form one composite-ready subframe occurring at any time prior to "II)f)" for the individual group.

Example 9d

Another sub-variant of Example 9b involves, for multiple groups of the sequence, combining the two second type subframes to form one composite-ready subframe occurring prior to a start of "II)".

Example 10—a Method of Filming Involving a Composite Environment

The method involves:
communicatively coupling a cinematic camera to a master control unit (MCU), the MCU being communicatively coupled to a tracking marker projector (TMP);
setting the cinematic camera to film subframes at a frame rate that is at least two times an intended final frame rate for a shot;
causing the cinematic camera to acquire images in the subframes, at the frame rate, wherein at least some of the images will include parts of a backdrop of the composite environment;
while the camera is acquiring the at least some images, and based upon the frame rate of the cinematic camera, the MCU will cause the TMP to operate such that, for sets of sequential subframes
a) the TMP will project tracking markers onto the backdrop, during a first subframe of a set of subframes, of only
i) a first indicating type, at a time immediately after a start of the first subframe and for a duration of less than 15 mS, and
ii) a second indicating type, distinguishable from the first indicating type, at a time immediately prior to an end of the first subframe, for the duration,
b) the TMP will not project tracking markers onto the backdrop, during a primary subframe of the set;
wherein "i)"-"ii)" will repeat, in sequence for subsequent sets, at least until filming of the sets of sequential subframes stops; and
wherein the tracking markers of the second indicating type before a group of one or more sequential primary subframes and the tracking markers of the first indicating type immediately following the group of one or more sequential primary subframes, jointly represent the cinematic camera's motion during acquisition of the one or more primary subframes therebetween.

Example 10a

A sub-variant of Example 10 involves the first indicating type being a first color, and the second indicating type being a second color.

Example 10b

A sub-variant of Example 10a involves the first color being one of red, green or blue.

Example 10c

Another sub-variant of Example 10a involves the second color being one of red, green or blue.

Example 10d

Another sub-variant of Example 10a involves the first indicating type being a first shape, and the second indicating type being a second shape.

Example 10e

Another sub-variant of Example 10 involves setting the cinematic camera to film subframes at a shutter angle of 360 degrees.

Example 11—a Method of Filming Involving a Composite Environment

The method involves:
receiving a signal from a cinematic camera, set to film images in subframes at a specified subframe filming rate that is at least twice an intended final frame rate for a shot, indicating a start of image acquisitions, wherein at least some of the images will include parts of a backdrop of the composite environment;
based upon the specified subframe filming rate, causing a tracking marker projector (TMP) to operate such that the TMP
a) will project tracking markers onto the backdrop, during a first subframe of a set of subframes, of only
i) a first indicating type, at a time immediately after a start of the first subframe of the set and for a duration of less than 15 mS, and
ii) a second indicating type, distinguishable from the first indicating type, at a time immediately prior to an end of the first subframe of the set, for the duration,
b) will not project tracking markers onto the backdrop, during one or more primary subframes of the set;

wherein "a)"-"b)" repeat, in sequence, until filming of sets of sequential subframes stops; and wherein the tracking markers of the second indicating type before a group of one or more sequential primary subframes and the tracking markers of the first indicating type immediately following the group of one or more sequential primary subframes, jointly represent the cinematic camera's motion during acquisition of the one or more primary subframes therebetween.

Example 11a

A sub-variant of Example 11 involves the first indicating type being a first color, and the second indicating type being a second color.

Example 11b

A sub-variant of Example 11a involves the first color being one of red, green or blue.

Example 11c

Another sub-variant of Example 11a involves the second color being one of red, green or blue.

Example 11d

Another sub-variant of Example 11a involves the first indicating type being a first shape, and the second indicating type being a second shape.

Example 11e

Another sub-variant of Example 11 a involves the first color having a wavelength
 a) of between 404 nm and 415 nm, inclusive,
 b) of 420 nm
 c) of 488 nm,
 d) of between 510 nm and 532 nm, inclusive, or
 e) of between 633 nm and 691 nm, inclusive.

Example 11f

Another sub-variant of Example 11 a involves the second color having a wavelength
 a) of between 404 nm and 415 nm, inclusive,
 b) of 420 nm
 c) of 488 nm,
 d) of between 510 nm and 532 nm, inclusive, or
 e) of between 633 nm and 691 nm, inclusive.

Example 11g

Another sub-variant of Example 11 involves the first indicating type being a first shape, and the second indicating type being a second shape.

Example 12—a Method of Filming Involving a Composite Environment

The method involves:
receiving a signal from a master control unit (MCU), indicating a timing for image acquisitions by a cinematic camera, set to film images in subframes at a specified subframe filming rate that is at least twice an intended final frame rate for a shot, wherein at least some of the images will include parts of a backdrop of the composite environment;
 based upon the received timing,
 a) projecting tracking markers onto the backdrop, during a first subframe of a set of subframes, of only
   i) a first indicating type, at a time immediately after a start of the first subframe and for a duration of less than 15 mS, and
   ii) a second indicating type, distinguishable from the first indicating type, at a time immediately prior to an end of the first subframe, for the duration,
 b) not projecting tracking markers onto the backdrop, during primary subframes of the set;
 repeating "a)"-"b)", in sequence, until receipt of a signal from the MCU indicating that projecting of tracking markers should stop; and
 wherein the tracking markers of the second indicating type before a group of one or more sequential primary subframes and the tracking markers of the first indicating type immediately following the group of one or more sequential primary subframes, jointly represent the cinematic camera's motion during acquisition of the one or more primary subframes therebetween.

Example 12a

A sub-variant of Example 12 involves the first indicating type being a first color, and the second indicating type being a second color.

Example 12b

A sub-variant of Example 12a involves the first color being one of red, green or blue.

Example 12c

Another sub-variant of Example 12a involves the second color being one of red, green or blue.

Example 12d

Another sub-variant of Example 12a involves the first indicating type being a first shape, and the second indicating type being a second shape.

Example 12e

Another sub-variant of Example 12a involves the first color having a wavelength
 a) of between 404 nm and 415 nm, inclusive,
 b) of 420 nm
 c) of 488 nm,
 d) of between 510 nm and 532 nm, inclusive, or
 e) of between 633 nm and 691 nm, inclusive.

Example 12f

Another sub-variant of Example 12a involves the second color having a wavelength
 a) of between 404 nm and 415 nm, inclusive,
 b) of 420 nm
 c) of 488 nm, d) of between 510 nm and 532 nm, inclusive, or e) of between 633 nm and 691 nm, inclusive.

Example 12g

Another sub-variant of Example 12 involves the first indicating type being a first shape, and the second indicating type being a second shape.

Example 13—a Non-Transitory Film Product

The film product involves:

a shot including a sequence of sets of image-containing subframes stored within non-transitory storage, all of the subframes being of a common duration, the contained images having been acquired by sensors of a cinematic camera, wherein each subframe in each set is one of two different types a) a first type subframe that contains an image captured by the sensors of the cinematic camera for the duration of the entire first type subframe, along with tracking markers of a first indicating type acquired within the image for a duration of less than 15 milliseconds immediately after the start of the first type subframe, and tracking markers of a second indicating type, different from the first indicating type, acquired within the image for the duration immediately prior to an end of the first type subframe, and b) a second type subframe that contains an image acquired by the sensors of the cinematic camera for the duration of the entire second type subframe and has no tracking markers within the image;

wherein each set consists of one first type subframe, followed by one or more second type subframes; and wherein the tracking markers of the second indicating type in a first set and the tracking markers of the first indicating type in a second set immediately following a last of the second type subframes in the set, jointly represent the cinematic camera's motion during filming of the image within the one or more second type subframes therebetween.

Example 13a

A sub-variant of Example 13 involves the shot having a final frame rate and the contained images being acquired by the sensors of the cinematic camera at a frame rate that is twice the final frame rate.

Example 13b

Another sub-variant of Example 13 involves the non-transitory storage for the image portion is physical film.

Example 13c

A sub-variant of Example 13b involves the non-transitory storage for the tracking image being physical film.

Example 13d

Another sub-variant of Example 13 involves the non-transitory storage being electronic storage.

Example 13e

Another sub-variant of Example 13 involves the first indicating type being a first color, and the second indicating type being a second color.

Example 13f

A sub-variant of Example 13e involves the first color being one of red, green or blue.

Example 13g

Another sub-variant of Example 13e involves the second color being one of red, green or blue.

Example 13h

Another sub-variant of Example 13e involves the first indicating type being a first shape, and the second indicating type being a second shape.

Example 14—a Method of Film Creation

The method involves:

I) accessing a shot, stored within non-transitory storage, comprising a sequence of subframes filmed using a cinematic camera in a composite environment, the subframes having been acquired by the cinematic camera such that, at least some of the subframes include backdrop, wherein the sequence comprises sequential sets of subframes of two different types a) a first type subframe that contains an image captured by the cinematic camera for the duration of the entire first type subframe, along with tracking markers of only a first indicating type acquired within the image for a duration of less than 15 milliseconds immediately after the start of the first type subframe, and tracking markers of only a second indicating type, different from the first indicating type, acquired within the image for the duration immediately prior to an end of the first type subframe, and b) a second type subframe that contains an image acquired by the sensors of the cinematic camera for the duration of the entire second type subframe and has no tracking markers within the image;

wherein each set consists of one first type subframe, followed by at least one second type subframe; and II) using a computerized film post processing system, processing the sequence by a) identifying the tracking markers of the second indicating type within the first type subframe of one set, b) identifying the tracking markers of the first indicating type within in a first type subframe of a new set immediately following the first set, c) using the identified second indicating type tracking markers as an indication of a starting perspective of the cinematic camera when acquisition of the image in the first type subframe began, and the identified first indicating type tracking markers as an indication of an ending perspective of the cinematic camera when acquisition of the image in the first type subframe ended, calculating a movement vector for the cinematic camera during acquisition of the at least one second type subframe in the first set, d) based upon the movement vector, match moving at least a portion of replacement image footage to the at least one second type subframe, e) compositing the portion of the match moved replacement image footage in place of backdrop present in the at least one second type subframe of the set, f) storing a result of the compositing in the non-transitory storage as a final frame, and g) repeating "II)a)"-"II)f)" for sets having any backdrop therein;

III) wherein, following completion of "II)", the final frames corresponding to the sequence will be a final version of the shot.

Example 14a

A sub-variant of Example 14 involves the first indicating type being a first color and the second indicating type being a second color, different from the first color, and wherein "II)a)"-"II)c)" further involve:

isolating the first color tracking markers; and
isolating the second color tracking markers.

Example 14b

A sub-variant of Example 14a involves motion tracking the first color markers into a first track, the first track having associated first track keyframe values, and motion tracking the second color markers into a second track, the second track having associated second track keyframe values.

Example 14c

A sub-variant of Example 14b involves combining the first track and second track by copying the respective first track keyframe values and second track keyframe values according to sampling times for each of the first color tracking markers and second color tracking markers.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A system for use with a cinematic camera that will be filming in a composite environment, the system comprising:
    a master control unit (MCU); and
    a tracking marker projector (TMP) via which multiple tracking markers can be projected, the TMP being communicatively connectable to the MCU;
    wherein the TMP is constructed to, for a pre-specified duration, periodically project multiple tracking markers onto a backdrop within the composite environment, using at least one light source, and
    wherein the MCU is constructed to be communicatively connectable to both the TMP and the cinematic camera and to control the operation of the TMP during filming of frames by the cinematic camera such that, when the MCU, the TMP, and the cinematic camera are communicatively connected
        a) based upon a filming frame rate of the cinematic camera, the MCU will cause the TMP to operate such that, according to a timing that is synchronized with the cinematic camera frame rate timing, the TMP will periodically
            i) during a first time, project the multiple tracking markers onto the backdrop for the pre-specified duration that is less than a frame period; and
            ii) during a second time, not project the tracking markers,
    such that, when the cinematic camera is filming in the composite environment and at least a portion of the backdrop is captured by the cinematic camera, an image stream will be captured that includes a pattern of interleaved images, some of the interleaved images having the backdrop with at least some of the multiple tracking markers and others of the interleaved images having the backdrop without any of the multiple tracking markers.

2. The system of claim 1, wherein the TMP comprises:
    at least one light source whose output forms the multiple tracking markers.

3. The system of claim 2, wherein the at least one light source comprises at least one laser that emits at a wavelength of between 380 nm and 740 nm inclusive.

4. The system of claim 2, wherein the at least one laser comprises a first laser that emits at a first wavelength corresponding to a first color and a second laser that emits at a second wavelength corresponding to a second color, wherein the second color is distinguishable from the first color.

5. The system of claim 2, wherein the first laser emits at a center wavelength that is one of
    a) between 404 nm and 415 nm, inclusive,
    b) 420 nm
    c) 488 nm,
    d) between 505 nm and 532 nm, inclusive, or
    e) between 633 nm and 691 nm, inclusive.

6. The system of claim 3, wherein the multiple tracking markers comprise a pattern of the at least one laser light source.

7. The system of claim 1, wherein the MCU includes controls for changing one or more operational parameters of the TMP.

8. The system of claim 7, wherein the operational parameters include any one or more of:
    a brightness setting for the projected multiple tracking markers, a timing offset from a start of a frame, a duration for display of tracking markers, or a setting to turn an individual tracking marker to be always on or off.

9. The system of claim 1 wherein the MCU further comprises:
    a remote control unit.

10. The system of claim 1 wherein the MCU is constructed to:
    measure and average a frame period of the cinematic camera connected to the MCU based upon a synchronization signal received by the MCU from the cinematic camera.

11. The system of claim 1, wherein the MCU and TMP are both contained within a common housing.

12. The system of claim 1, wherein "a)i)" is timed to occur during the cinematic camera's blanking intervals.

13. The system of claim 1, wherein the filming frame rate is at least double an intended final frame rate of final film that will result from compositing to-be-inserted images in place of backdrop portions.

14. The system of claim 13, wherein the filming frame rate is at least quadruple the intended final frame rate.

15. A master control unit (MCU) device for use in a composite environment, the MCU comprising:
- at least one interface through which the MCU will communicate with at least one cinematic camera and at least one tracking marker projector (TMP);
- at least one processor; and
- storage;
- wherein, when the MCU is operating, in response to receipt of a signal from the at least one cinematic camera set to film at a specified frame rate and shutter angle, the at least one processor of the MCU will, based upon the specified frame rate and shutter angle of the at least one cinematic camera, cause the at least one TMP, coupled to the MCU, to project tracking markers onto a backdrop within the composite environment in a repeating manner, for a specified duration, so that sensors of the at least one cinematic camera will capture images both with, and without, projected tracking markers, in a repeating pattern.

16. The device of claim 15, wherein, when the MCU is operating, the at least one processor of the MCU will, at least once, measure and average a frame period of the at least one cinematic camera, based upon a synchronization signal received by the MCU from the at least one cinematic camera.

17. The device of claim 15, further comprising:
- controls for changing one or more operational parameters of the TMP.

18. The device of claim 15, further comprising:
- a remote control unit via which a user can control the MCU.

19. The device of claim 15, further comprising:
- a remote control unit via which one or more operational parameters of the TMP can be changed.

* * * * *